(12) United States Patent
Nakano et al.

(10) Patent No.: US 8,130,457 B2
(45) Date of Patent: Mar. 6, 2012

(54) MAGNETIC RECORDING/REPRODUCING APPARATUS AND METHOD FOR DETERMINING MAGNETIC RECORDING CONDITION

(75) Inventors: Ikuo Nakano, Osaka (JP); Yoshiteru Murakami, Osaka (JP); Shigemi Maeda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 223 days.

(21) Appl. No.: 12/514,256

(22) PCT Filed: Nov. 7, 2007

(86) PCT No.: PCT/JP2007/071619
§ 371 (c)(1),
(2), (4) Date: May 8, 2009

(87) PCT Pub. No.: WO2008/062671
PCT Pub. Date: May 29, 2008

(65) Prior Publication Data
US 2009/0303629 A1 Dec. 10, 2009

(30) Foreign Application Priority Data

Nov. 24, 2006 (JP) ................................. 2006-316634

(51) Int. Cl.
*G11B 27/36* (2006.01)
*G11B 5/02* (2006.01)
(52) U.S. Cl. .......................................... 360/31; 360/59
(58) Field of Classification Search .................. None
See application file for complete search history.

(56) References Cited

U.S. PATENT DOCUMENTS

| 7,665,102 | B2* | 2/2010 | Taguchi et al. ............... 720/659 |
| 2002/0057511 | A1 | 5/2002 | Kikitsu et al. |
| 2004/0194119 | A1 | 9/2004 | Miyanishi et al. |
| 2004/0194199 | A1 | 10/2004 | Tung |
| 2006/0117333 | A1 | 6/2006 | Taguchi et al. |
| 2007/0159720 | A1* | 7/2007 | Sohn et al. .................... 360/128 |

FOREIGN PATENT DOCUMENTS

| JP | 7-161040 A | 6/1995 |
| JP | 8-167149 A | 6/1996 |
| JP | 9-167371 A | 6/1997 |
| JP | 2002-175602 A | 6/2002 |
| JP | 2003-85702 A | 3/2003 |
| JP | 2004-303299 A | 10/2004 |
| JP | 2006-155795 A | 6/2006 |

* cited by examiner

*Primary Examiner* — Daniell L Negron
(74) *Attorney, Agent, or Firm* — Birch, Stewart, Kolasch & Birch, LLP

(57) ABSTRACT

A magnetic recording/reproducing apparatus 100 includes: a magnetic head 1; a magnetic recording medium 2; a spindle 3 and a spindle motor 4; a suspension arm 5; a voice coil motor 6; and a control unit 7. The control unit 7 has: a motor driver 8; a head amplifier 9; a read/write channel 10; a laser driver 11; and a controller 12. The controller 12 has: a preliminary recording unit 13; a judgment unit 14; an extraction unit 15; a drive condition determining unit 16; and a preliminary recording terminating unit 17. Based on a reproduction signal evaluation value obtained using these units and a predetermined reference value, a drive condition is determined which is suitable for recording onto the magnetic recording medium 2.

10 Claims, 16 Drawing Sheets

MAGNETIC RECORDING/REPRODUCING APPARATUS AND METHOD FOR
DETERMINING MAGNETIC RECORDING
CONDITION

TECHNICAL FIELD

The present invention relates to a magnetic recording/reproducing apparatus including: heat means for heating a recording area of a magnetic recording medium; a recording head which magnetically records information onto the magnetic recording medium; and a magnetoresistive reproducing head which reproduces information recorded onto the magnetic recording medium, and relates to a method for determining a magnetic recording condition in the apparatus.

BACKGROUND ART

In recent years, research has been conducted on heat-assisted magnetic recording technology which achieves high-density recording by a combination of optical technology and magnetic recording/reproducing technology. The heat-assisted magnetic recording technology is used in a magnetic recording/reproducing apparatus having heat means, a recording head, a reproducing head, and a magnetic recording medium. The following is a brief description of the operation of such a magnetic recording/reproducing apparatus. At a time of recording, first, in order to decrease coercivity of an area onto which data should be recorded ("recording area") in the magnetic recording medium of the magnetic recording/reproducing apparatus, the temperature of the recording area is increased using the heat means (e.g., by applying laser light), and then, information is magnetically recorded onto the magnetic recording medium in such a way that an external magnetic field is applied to the recording area using the recording head. That is, heat-assisted magnetic recording is conducted. Meanwhile, at a time of reproduction, first, an area of the magnetic recording medium, which is subjected to reproduction ("reproduction area") is heated using the heat means (e.g., by applying laser light), so that the temperature of the heated area is shifted from a compensation temperature and saturation magnetization is increased. Then, information is read out by the reproducing head.

Here is provided a brief description of the principle of heat-assisted magnetic recording. First, a graph in FIG. 16 shows an example of the relation among coercivity Hc, magnetization M, and temperature T, of a recording layer of a magnetic recording medium used in the above-described heat-assisted magnetic recording/reproducing apparatus. The recording layer having the property as illustrated in FIG. 16 shows extremely high coercivity Hc at or around room temperature (temperature E to temperature G), and therefore magnetic recording is difficult using a magnetic field generated by a typical recording head. However, such a recording layer is advantageous in that: its extremely high magnetic stability does not allow a weak magnetic field to erase information once recorded; and its high magnetization realizes high output by the reproducing head. Note that, however, as the temperature of the magnetic recording medium increases, the coercivity Hc of the magnetic recording medium decreases, and reaches approximately zero at its Curie point (Tc). Therefore, heating of the magnetic recording medium to raise the temperature thereof to temperature H, a temperature near the Curie point, allows recording to be conducted with a magnetic field used in a typical magnetic recording/reproducing apparatus. The Curie point varies depending on a material used as a magnetic layer or its composition, and ranges from 100° C. to 250° C., approximately. Thus, the stability of recorded information is ensured by conducting heat-assisted magnetic recording with the use of a magnetic recording medium including a magnetic layer higher in coercivity than that of a magnetic recording medium used in a typical recording method. The below-mentioned patent document 1 discloses this kind of heat-assisted magnetic recording technology.

Patent document 1: Japanese Unexamined Patent Publication No. 85702/2003 (Tokukai 2003-85702)

DISCLOSURE OF THE INVENTION

Problems to be Solved by the Invention

In heat-assisted magnetic recording as described above, a recording condition for recording information is constituted by: the intensity of magnetic field applied to the magnetic recording medium (condition of magnetic field); and a drive condition of the heat means (condition which determines heating power that is thermal energy provided by the heat means to the magnetic recording medium). For example, the stronger magnetic field is applied to the magnetic recording medium, the smaller heating power is required, while the weaker magnetic field is applied to the magnetic recording medium, the larger heating power is required. In other words, for a magnetic recording medium having a certain magnetic property, there exist a plurality of, i.e., more than one, optimum recording conditions.

In the meantime, magnetic recording/reproducing apparatuses are used in a very wide range of environmental temperatures. For an apparatus to be mounted on a vehicle, for example, the range is from −20° C. to 80° C. As the environmental temperature varies, the temperature of a magnetic recording medium also varies accordingly. Therefore, the temperature of a heated magnetic recording medium may be increased in excess of its Curie point when recording is conducted at very high environmental temperatures under a recording condition derived by: setting heating power applied to the magnetic recording medium to be constant regardless of the environmental temperature; and adjusting a magnetic field applied to the magnetic recording medium in accordance with the constant heating power. Such an increase makes it impossible to record information onto the magnetic recording medium. Generally, in a magnetic recording medium, a servo pattern which is used for positioning a magnetic recording head ("tracking operation") is magnetically recorded on a track for information to be recorded. If this servo pattern is erased because the temperature of the heated magnetic recording medium exceeds its Curie point, a problem is caused, that is, the tracking operation cannot be conducted.

An object of the present invention is to provide a magnetic recording/reproducing apparatus and a method for determining a magnetic recording condition, by each of which heat-assisted magnetic recording is able to be conducted without substantially affected by environmental temperature.

Means for Solving the Problems and Effects

A magnetic recording/reproducing apparatus of the present invention includes: a recording head; a magnetoresistive reproducing head; a magnetic recording medium onto which information is recordable; and heat means for heating a recording area of the magnetic recording medium. The apparatus has a configuration such that information is recorded onto the magnetic recording medium by applying current to the recording head to generate a magnetic field while heating the recording area of the magnetic recording medium with the heat means thereby to reduce coercivity of the magnetic recording medium; and information recorded onto the recording area of the magnetic recording medium is reproduced with the reproducing head. The magnetic recording/reproducing apparatus includes: preliminary recording means for preliminarily recording information onto the recording area of the magnetic recording medium, by exerting control so that constant current or current with a constant amplitude waveform is applied to the recording head, while driving the heat means in accordance with a preliminary drive condition so that heating power is provided by the heat means to the recording area of the magnetic recording medium; judgment means for judging which one of a reproduction signal evaluation value and a predetermined reference value is superior to the other, the reproduction signal evaluation value resulting from a reproduction signal obtained through reproduction, by the reproducing head, of information which has been preliminarily recorded by the preliminary recording means onto the recording area; extraction means for controlling the preliminary recording means and the judgment means so that preliminary recording of information onto the recording area is conducted by the preliminary recording means once or multiple times using a different preliminary drive condition each time, until the judgment means produces a judgment result indicating that the reproduction signal evaluation value is in agreement with or superior to the reference value, and for extracting a preliminary drive condition of the heat means corresponding to the judgment result by the judgment means indicating that the reproduction signal evaluation value is in agreement with or superior to the reference value; and drive condition determining means for determining that the preliminary drive condition extracted by the extraction means is a drive condition of the heat means, which is used when information is recorded onto the magnetic recording medium.

According to the present invention, even if environmental temperature is changed, e.g., seasonally, it is possible to quickly obtain a preferable drive condition of the heat means, under which the temperature of the magnetic recording medium is adjusted to an intended temperature (e.g., a temperature falling within a range suitable for conducting recording onto the magnetic recording medium). As a result, it is possible to provide a magnetic recording/reproducing apparatus capable of conducting heat-assisted magnetic recording without substantially affected by environmental temperature. In addition, overheating of the magnetic recording medium is prevented when information is recorded. Therefore, the magnetic recording medium is not damaged.

As a reproduction signal evaluation value, may be used is: the amplitude of a reproduction signal; Bit Error Rate (BER); an estimated value of Bit Error Rate obtained using SAM (Sequenced Amplitude Margin); or the like. Environmental temperature used herein means ambient temperature of the magnetic recording medium. Strictly speaking, however, it means the temperature of the magnetic recording medium before application of heating power from the heat means since the temperature the magnetic recording medium also varies affected by ambient temperature.

It is preferable that the extraction means controls the preliminary recording means so that heating power provided to the recording area is gradually increased with the number of times preliminary recording is conducted when preliminary recording of information onto the recording area is conducted by the preliminary recording means multiple times. In this structure, heating power is gradually changed from small heating power to large heating power, and therefore it is possible to select a drive condition corresponding to minimum heating power.

In another aspect, a magnetic recording/reproducing apparatus of the present invention includes: a recording head; a magnetoresistive reproducing head; a magnetic recording medium onto which information is recordable; and heat means for heating a recording area of the magnetic recording medium. The apparatus has a configuration such that: information is recorded onto the magnetic recording medium by applying current to the recording head to generate a magnetic field while heating the recording area of the magnetic recording medium with the heat means thereby to reduce coercivity of the magnetic recording medium; and information recorded onto the recording area of the magnetic recording medium is reproduced with the reproducing head. The magnetic recording/reproducing apparatus includes: preliminary recording means for preliminarily recording information onto the recording area of the magnetic recording medium, by exerting control so that constant current or current with a constant amplitude waveform is applied to the recording head, while driving the heat means in accordance with a preliminary drive condition so that heating power is provided by the heat means to the recording area of the magnetic recording medium; judgment means for judging which one of a reproduction signal evaluation value and a predetermined reference value is superior to the other, the reproduction signal evaluation value resulting from a reproduction signal obtained through reproduction, by the reproducing head, of information which has been preliminarily recorded by the preliminary recording means onto the recording area; extraction means for controlling the preliminary recording means so that preliminary recording of information onto the recording area is conducted by the preliminary recording means multiple times using a different preliminary drive condition each time and for extracting, from a plurality of preliminary drive conditions respectively corresponding to preliminary recording conducted multiple times, a preliminary drive condition corresponding to a reproduction signal evaluation value which (i) has a judgment result by the judgment means indicating that the reproduction signal evaluation value is in agreement with or superior to the reference value and (ii) is the best value among a plurality of reproduction signal evaluation values corresponding to the plurality of preliminary drive conditions; and drive condition determining means for determining that the preliminary drive condition extracted by the extraction means is a drive condition of the heat means, which is used when information is recorded onto the magnetic recording medium.

With this structure, even if environmental temperature is changed, e.g., seasonally, it is possible to quickly obtain a preferable drive condition of the heat means, under which the temperature of the magnetic recording medium is adjusted to an intended temperature (e.g., a temperature falling within a range suitable for conducting recording onto the magnetic recording medium). As a result, it is possible to provide a magnetic recording/reproducing apparatus capable of conducting heat-assisted magnetic recording without substantially affected by environmental temperature. In addition, overheating of the magnetic recording medium is prevented when information is recorded.

It is preferable that: assuming that first preliminary recording is excluded from consideration, every time the preliminary recording means conducts preliminary recording of information onto the recording area, the judgment means judges which one of a reproduction signal evaluation value corresponding to preliminary recording currently conducted and the reference value is superior to the other; and every time the judgment means produces a judgment result indicating that a reproduction signal evaluation value is in agreement with or superior to the reference value, the extraction means judges which one of reproduction signal evaluation values is superior to the other, between the reproduction signal evaluation value currently obtained and a previous reproduction signal evaluation value having a immediately preceding judgment result by the judgment means indicating that the reproduction signal evaluation value is in agreement with or superior to the reference value. This makes it possible to efficiently extract a drive condition corresponding to the best reproduction signal evaluation value.

It is preferable that: the extraction means controls the preliminary recording means so that heating power provided to the recording area is gradually increased with the number of times preliminary recording is conducted when preliminary recording of information onto the recording area is conducted by the preliminary recording means multiple times; and when it is judged that the reproduction signal evaluation value currently obtained is inferior to the previous reproduction signal evaluation value as a result of judgment about superiority between the two reproduction signal evaluation values, the extraction means extracts a preliminary drive condition corresponding to the previous reproduction signal evaluation value, from a plurality of preliminary drive conditions respectively corresponding to preliminary recording that has been conducted multiple times. In this structure, it is possible to select a drive condition corresponding to minimum heating power. In addition, since no more preliminary recording is conducted after the reproduction signal evaluation value currently obtained is inferior to the previous reproduction signal evaluation value, it is possible to reduce the possibility of overheating of the magnetic recording medium. It should be noted that, "assuming that first preliminary recording is excluded from consideration" means that: immediately after the preliminary recording means conducts preliminary recording in a first cycle, which one of a reproduction signal evaluation value resulting from the first preliminary recording and the reference value is superior to the other may be judged, but is not necessarily judged.

It is preferable to further include preliminary recording terminating means for controlling the extraction means so that the preliminary recording means conducts no more preliminary recording after heating power provided to the recording area reaches a predetermined upper limit. In this structure, the upper limit of heating power is set. This further ensures that overheating of the magnetic recording medium is prevented.

It is preferable that: the heat means includes a light-emitting element; and the magnetic recording medium is heated using light emitted from the light-emitting element. In this structure, the heat means includes the light-emitting element, and therefore it is possible to improve the frequency of repeatedly changing heating and non-heating, and thereby to improve recording rate onto the magnetic recording medium. In addition, it is possible to heat the magnetic recording medium more efficiently when the magnetic recording medium is heated by light directly.

In the case where the magnetic recording medium is heated by the use of the light-emitting element, the temperature of the magnetic recording medium may reach an unintended value, affected by not only environmental temperature but also an amount of light emitted from the light-emitting element, i.e., heating power. The relation between current supplied to the light-emitting element and the amount of emitted light depends on the temperature of the element, that is, environmental temperature. Therefore, under high environmental temperatures, there is a possibility that the magnetic recording medium may be damaged by overheating. In order to avoid this problem, it is important to provide a light-amount monitor. However, in the present invention, overheating of the magnetic recording medium is prevented. Therefore, such a light-amount monitor does not have to be provided.

It is preferable that: the recording head has a metal wire which generates a recording magnetic field as a result of applying the constant current or the current with a constant amplitude waveform to the metal wire; and the magnetic recording medium is heated by near-field light which is generated as a result of applying light emitted from the light-emitting element to the metal wire. This structure makes it possible to heat a smaller area, thereby improving recording density.

The metal wire which constitutes a part of the recording head absorbs applied light, so that the temperature thereof increases. In addition, the recording head is near the heated magnetic recording medium, spaced therefrom as close as approximately 10 nm. Accordingly, the metal wire is heated by transferred heat or radiant heat from the magnetic recording medium, and as a result, the temperature of the metal wire may be considerably increased. A large increase in temperature may cause fatigue phenomenon in the metal wire, due to thermal stress generated along with a repeated rise and fall in temperature. In addition, a huge increase in temperature may possibly cause the metal wire to be melted and broken. However, in the present invention, it is possible to restrain the increase in temperature of the metal wire since overheating of the magnetic recording medium is prevented and drive current for the light-emitting element is reduced at high environmental temperatures. As a result, overheating of the metal wire is prevented, and thereby it is possible to give a longer life to the recording head, and to prevent the breakage of the recording head.

It is preferable that: the magnetic recording medium is disk-shaped; the preliminary recording means preliminarily records, while rotating the magnetic recording medium at a predetermined angular velocity, information onto (i) a first preliminary recording area which covers a location at a distance ri from a center of the magnetic recording medium and is provided in the recording area of the magnetic recording medium, and (ii) a second preliminary recording area which covers a location at a distance ro (ro>ri) from the center of the magnetic recording medium and is provided in the recording area of the magnetic recording medium so as to be closer to the outer circumference of the magnetic recording medium than the first preliminary recording area is; the drive condition determining means determines drive conditions of the heat means respectively used at: a location within the first preliminary recording area, which location is at the distance ri from the center of the magnetic recording medium, and a location within the second preliminary recording area, which location is at the distance ro from the center of the magnetic recording medium; and the magnetic recording/reproducing apparatus further includes drive condition deriving means for deriving a drive condition of the heat means, which is used when information is recorded at a location being at an arbitrary distance r from the center of the magnetic recording medium rotated at the predetermined angular velocity, based on heating power Pr obtained using the following equation (A):

$$Pr=Pi+(r-ri)\times(Po-Pi)/(ro-ri) \tag{A}$$

(where: Pi is heating power provided to the first preliminary recording area of the magnetic recording medium by the heat means driven under the drive condition which is determined by the drive condition determining means for the location at the distance ri;

Po is heating power provided to the second preliminary recording area of the magnetic recording medium by the heat means driven under the drive condition which is determined by the drive condition determining means for the location at the distance ro; and Pr is heating power used for recording information at a location which is at an arbitrary distance r from the center of the magnetic recording medium).

In the magnetic recording medium rotated at a predetermined angular velocity, linear velocity differs depending on a distance from the center. That is, even if same heating power is applied, temperature after heating differs depending on the distance. With the above structure, it is possible to easily determine a drive condition of the heat means, which is used when information is recorded at a location being at an arbitrary distance r from the center, based on the drive conditions determined by the drive condition determining means for the first preliminary recording area and the second preliminary recording area, respectively. This drive condition is obtained in short time, only by calculation, except that preliminary recording is conducted twice.

It is preferable that: the magnetic recording medium is disk-shaped; the preliminary recording means preliminarily records, while rotating the magnetic recording medium at a predetermined angular velocity, information onto (i) a first preliminary recording area which covers a location at a distance ri from a center of the magnetic recording medium and is provided in the recording area of the magnetic recording medium, and (ii) a second preliminary recording area which covers a location at a distance ro (ro>ri) from the center of the magnetic recording medium and is provided in the recording area of the magnetic recording medium so as to be closer to the outer circumference of the magnetic recording medium than the first preliminary recording area is; the drive condition determining means determines drive conditions of the heat means respectively used at: a location within the first preliminary recording area, which location is at the distance ri from the center of the magnetic recording medium, and a location within the second preliminary recording area, which location is at the distance ro from the center of the magnetic recording medium; and the magnetic recording/reproducing apparatus further includes drive condition deriving means for determining that a drive condition of the heat means used at a location being at a distance rc from the center of the magnetic recording medium rotated at the predetermined angular velocity is a drive condition of the heat means to be used when information is recorded onto a recording area interposed between the first preliminary recording area and the second preliminary recording area, the distance rc being an average distance of the distance ro and the distance ri, the drive condition of the heat means used at the location at the distance rc being derived based on heating power Prc obtained using the following equation (B):

$$Prc=Pi+(rc-ri)\times(Po-Pi)/(ro-ri) \quad (B)$$

(where: Pi is heating power provided to the first preliminary recording area of the magnetic recording medium by the heat means driven under the drive condition which is determined by the drive condition determining means for the location at the distance ri;

Po is heating power provided to the second preliminary recording area of the magnetic recording medium by the heat means driven under the drive condition which is determined by the drive condition determining means for the location at the distance ro; and Prc is heating power used for recording information at a location which is at the distance rc from the center of the magnetic recording medium).

It is possible to easily determine a drive condition of the heat means, which is used when information is recorded at a location being at an arbitrary distance from the center, in short time only by calculation, except that preliminary recording is conducted twice. If a drive condition of the heat means is determined for every radial distance, an amount of data of the drive conditions becomes extremely large, and it is necessary to increase the capacity of the storage means in order to store the data. However, the above structure makes it possible to minimize the amount of data of the drive conditions, and this allows the capacity of the storage means to be relatively small. Furthermore, once the drive condition deriving means determines a drive condition of the heat means, no more calculation is needed to determine a drive condition of the heat means wherever information is recorded. Therefore, the amount of calculation needed is small.

It is preferable that: the magnetic recording medium is disk-shaped; the recording area of the magnetic recording medium is provided with a plurality of zones which do not overlap one another with regard to each range of distance from a center of the magnetic recording medium, in each of which zones an internal transfer rate is constant; the preliminary recording means preliminarily records, while rotating the magnetic recording medium at a predetermined angular velocity, information onto (i) a first preliminary recording area which covers a location at a distance ri from the center of the magnetic recording medium and is provided in the recording area of the magnetic recording medium, and (ii) a second preliminary recording area which covers a location at a distance ro (ro>ri) from the center of the magnetic recording medium and is provided in the recording area of the magnetic recording medium so as to be closer to the outer circumference of the magnetic recording medium than the first preliminary recording area is; the drive condition determining means determines drive conditions of the heat means respectively used at: a location within the first preliminary recording area, which location is at the distance ri from the center of the magnetic recording medium, and a location within the second preliminary recording area, which location is at the distance ro from the center of the magnetic recording medium; and the magnetic recording/reproducing apparatus further includes drive condition deriving means for determining that a drive condition of the heat means used when information is recorded at a location midway between a location farthest from the center and a location closest to the center in each of the zones of the magnetic recording medium rotated at the predetermined angular velocity is a drive condition of the heat means to be used when information is recorded onto the associated one of the zones, the drive condition of the heat means used at each midway location being derived based on heating power Pr obtained using the following equation (C):

$$Pr=Pi+(rz-ri)\times(Po-Pi)/(ro-ri) \quad (C)$$

(where: Pi is heating power provided to the first preliminary recording area of the magnetic recording medium by the heat means driven under the drive condition which is determined by the drive condition determining means for the location at the distance ri;

Po is heating power provided to the second preliminary recording area of the magnetic recording medium by the heat means driven under the drive condition which is determined by the drive condition determining means for the location at the distance ro; and Pr is heating power used for recording information at the midway location in each zone of the magnetic recording medium (location at a distance rz from the center of the magnetic recording medium)).

It is possible to easily determine a drive condition of the heat means, which is used when information is recorded at a location being at an arbitrary distance from the center, in short time only by calculation, except that preliminary recording is conducted twice. If a drive condition of the heat means is determined for every radial distance, an amount of data of the drive conditions becomes extremely large, and it is necessary to increase the capacity of the storage means in order to store the data. However the above structure, in which one drive condition is determined for each zone, allows the amount of data of the drive conditions to be relatively small. Therefore, the capacity of the storage means may be relatively small. Furthermore, once the drive condition deriving means determines a drive condition of the heat means for each zone, no more calculation is needed to determine a drive condition of the heat means wherever information is recorded. Therefore, the amount of calculation needed is small. In addition, since a drive condition of the heat means is determined for each of the plurality of zones, it is possible to heat each zone with heating power suitable for that zone.

Information on the drive conditions determined by the drive condition determining means and the drive condition deriving means may be recorded onto an area closer to the outer circumference than a user recording area in the magnetic recording medium is, onto which user recording area information a user desires to record is recorded. In this structure, it is possible to reduce a period of time needed to read out information on the drive conditions recorded onto the magnetic recording medium.

A method for determining a magnetic recording condition of the present invention is used in a magnetic recording/reproducing apparatus including: a recording head; a magnetoresistive reproducing head; a magnetic recording medium onto which information is recordable; and heat means for heating a recording area of the magnetic recording medium, the apparatus having a configuration such that: information is recorded onto the magnetic recording medium by applying current to the recording head to generate a magnetic field while heating the recording area of the magnetic recording medium with the heat means thereby to reduce coercivity of the magnetic recording medium; and information recorded onto the recording area of the magnetic recording medium is reproduced with the reproducing head. The method for determining a magnetic recording condition includes: an extraction step of conducting two steps of a preliminary recording step and a judgment step once or multiple times using a different preliminary drive condition each time until a judgment result is produced in the judgment step which indicates that a reproduction signal evaluation value is in agreement with or superior to a predetermined reference value, and thereby extracting a preliminary drive condition of the heat means corresponding to the judgment result in the judgment step indicating that the reproduction signal evaluation value is in agreement with or superior to the reference value, the preliminary recording step being a step of preliminarily recording information onto the recording area of the magnetic recording medium, by exerting control so that constant current or current with a constant amplitude waveform is applied to the recording head, while driving the heat means in accordance with a preliminary drive condition so that heating power is provided by the heat means to the recording area of the magnetic recording medium, the judgment step being a step of judging which one of a reproduction signal evaluation value and the reference value is superior to the other, the reproduction signal evaluation value resulting from a reproduction signal obtained through reproduction, by the reproducing head, of information which has been preliminarily recorded onto the recording area in the preliminary recording step; and a drive condition determining step of determining that the preliminary drive condition extracted in the extraction step is a drive condition of the heat means, which is used when information is recorded onto the magnetic recording medium.

In another aspect, a method for determining a magnetic recording condition of the present invention is used in a magnetic recording/reproducing apparatus including: a recording head; a magnetoresistive reproducing head; a magnetic recording medium onto which information is recordable; and heat means for heating a recording area of the magnetic recording medium, the apparatus having a configuration such that: information is recorded onto the magnetic recording medium by applying current to the recording head to generate a magnetic field while heating the recording area of the magnetic recording medium with the heat means thereby to reduce coercivity of the magnetic recording medium; and information recorded onto the recording area of the magnetic recording medium is reproduced with the reproducing head. The method for determining a magnetic recording condition includes: an extraction step of conducting two steps of a preliminary recording step and a judgment step multiple times using a different preliminary drive condition each time until a judgment result is produced in the judgment step which indicates that a reproduction signal evaluation value is in agreement with or superior to a predetermined reference value, and thereby extracting, from a plurality of preliminary drive conditions respectively corresponding to preliminary recording conducted multiple times, a preliminary drive condition corresponding to a reproduction signal evaluation value which (i) has a judgment result in the judgment step indicating that the reproduction signal evaluation value is in agreement with or superior to the reference value and (ii) is the best value among a plurality of reproduction signal evaluation values corresponding to the plurality of preliminary drive conditions, the preliminary recording step being a step of preliminarily recording information onto the recording area of the magnetic recording medium, by exerting control so that constant current or current with a constant amplitude waveform is applied to the recording head, while driving the heat means in accordance with a preliminary drive condition so that heating power is provided by the heat means to the recording area of the magnetic recording medium, the judgment step being a step of judging which one of a reproduction signal evaluation value and the reference value is superior to the other, the reproduction signal evaluation value resulting from a reproduction signal obtained through reproduction, by the reproducing head, of information which has been preliminarily recorded onto the recording area in the preliminary recording step; and a drive condition determining step of determining that the preliminary drive condition extracted in the extraction step is a drive condition of the heat means, which is used when information is recorded onto the magnetic recording medium.

BEST MODE FOR CARRYING OUT THE INVENTION

First Embodiment

Figure 1:
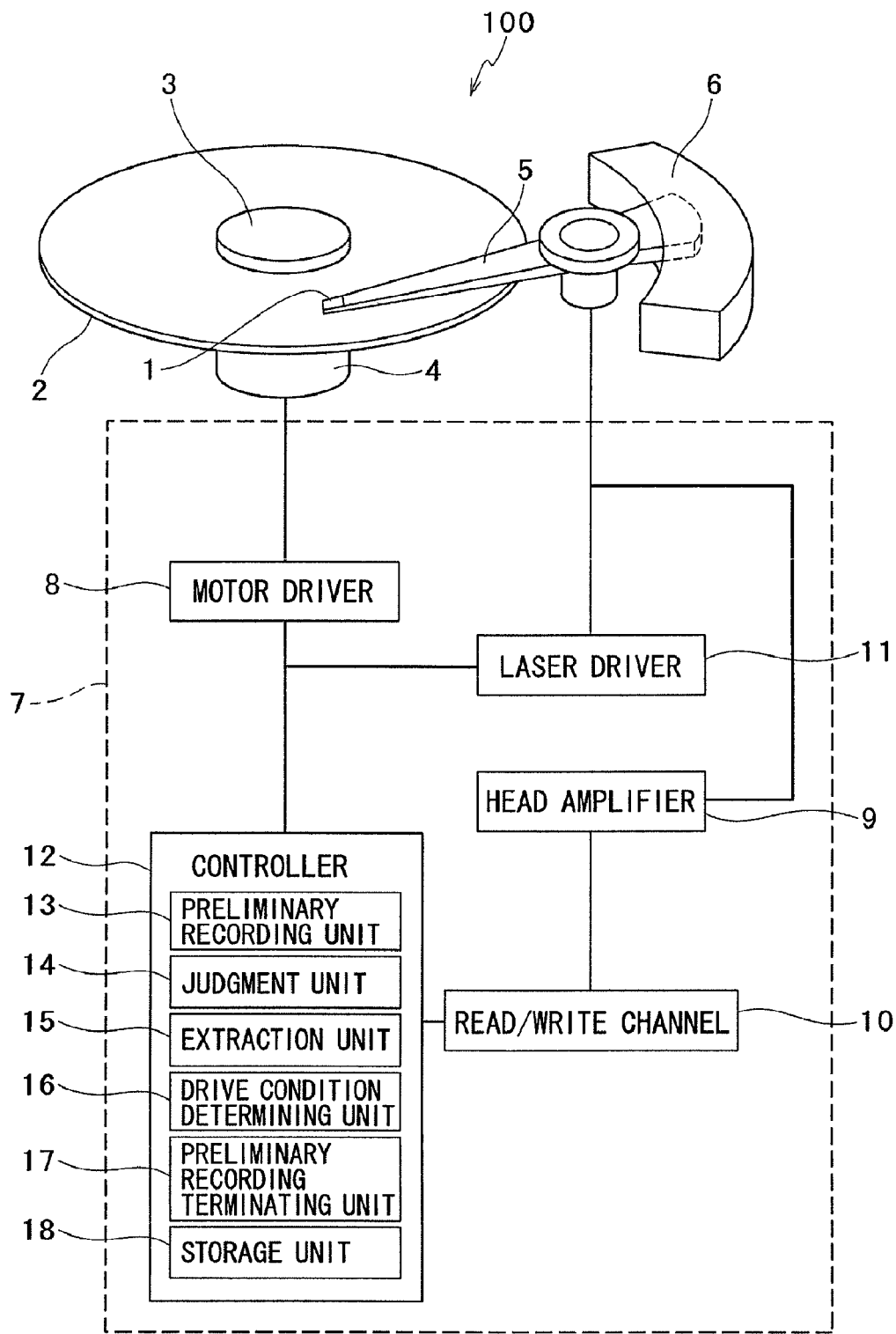
FIG. 1 A schematic view of a magnetic recording/reproducing apparatus of a first embodiment of the present invention.
Figure 2:
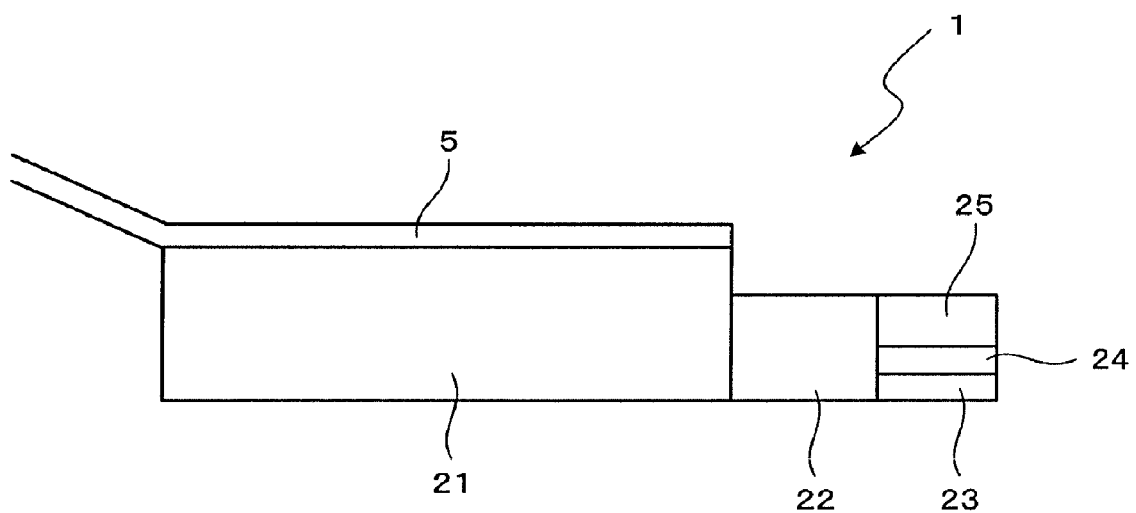
FIG. 2 A longitudinal sectional view of a magnetic head of the magnetic recording/reproducing apparatus illustrated in FIG. 1.
Figure 3:
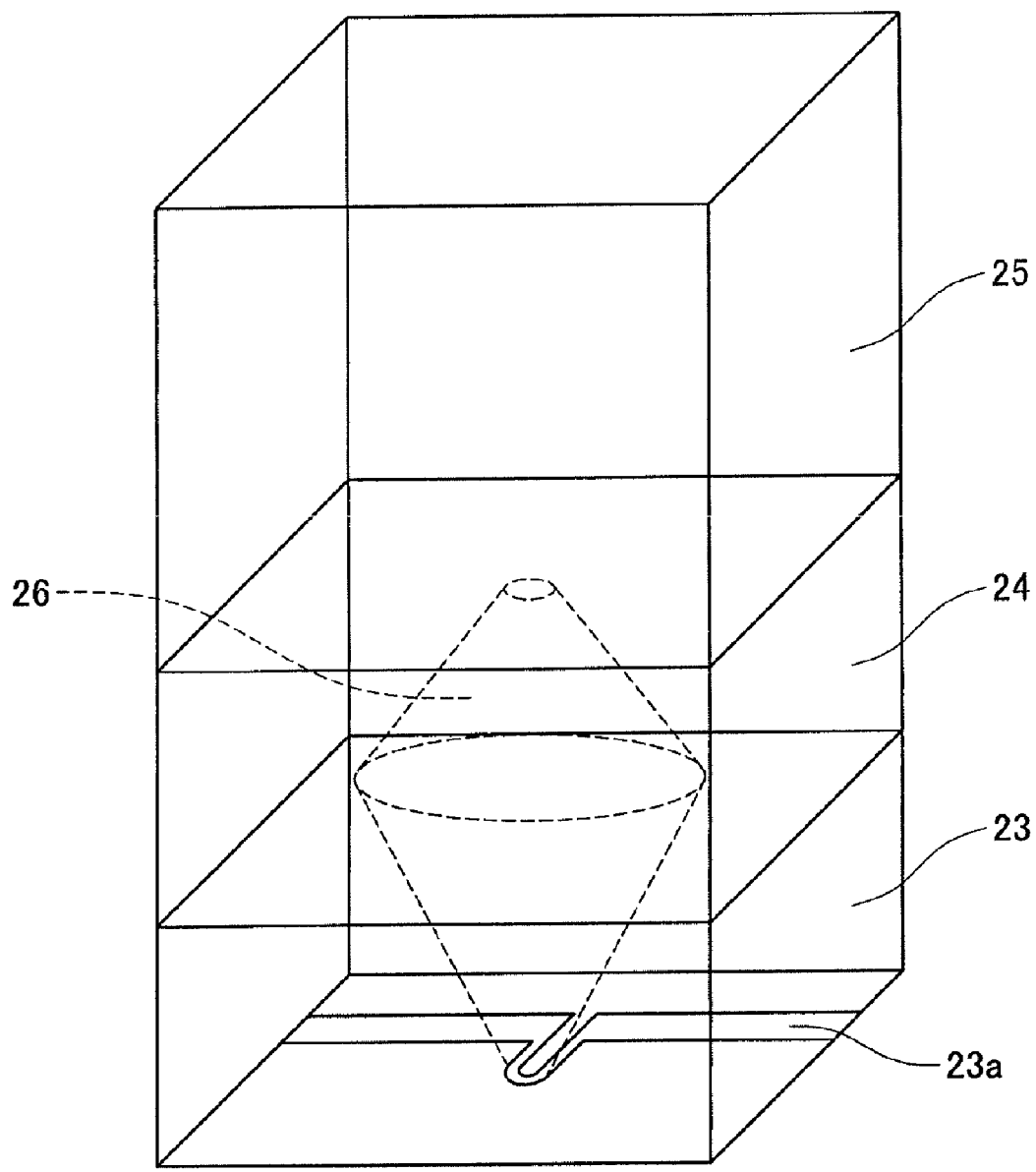
FIG. 3 A perspective view of the magnetic head illustrated in FIG. 2.

First, the following describes a magnetic recording/reproducing apparatus of a first embodiment of the present invention, with reference to FIGS. 1 to 3.

As illustrated in FIG. 1, a magnetic recording/reproducing apparatus 100 of this embodiment includes: a magnetic head 1 for magnetic recording and magnetic reproducing; a disk-shaped magnetic recording medium 2; a spindle 3 and a spindle motor 4 for rotating the magnetic recording medium 2; a suspension arm 5 which supports and fixes the magnetic head 1 at the leading end thereof; a voice coil motor 6 which swings the suspension arm 5 above the magnetic recording medium 2 to move the magnetic head 1 to a desired location above the magnetic recording medium 2; and a control block 7 for controlling these members. The control block 7 includes: a motor driver 8 which controls the spindle motor 4 and the voice coil motor 6; a head amplifier 9 which amplifies a signal to be written to/read out from the magnetic recording medium 2 and exchanges such a signal with the magnetic head 1; a read/write channel 10 which is a circuit for encoding a signal to be recorded onto the magnetic recording medium 2 and decoding a reproduced signal; a laser driver 11 which controls drive current of a semiconductor laser provided to the magnetic head 1; and a controller 12 which is connected to the motor driver 8, read/write channel 10, and laser driver 11, and controls these members. The spindle motor 4 and the motor driver 8 rotate the magnetic recording medium 2 at a constant angular velocity, in each of the cases of: recording, reproducing, and later-described preliminary recording.

As illustrated in FIG. 2, the magnetic head 1 includes: a slider 21 formed at a leading end of the suspension arm 5; a reproducing head 22 and a recording head 23 which are formed in this order at one end of the slider 21; and a gradient index lens 24 and a semiconductor laser element 25 which are stacked in this order from the bottom, in a thickness direction of the recording head 23 (a vertical direction in FIG. 2).

The reproducing head 22 is a magnetic sensor for reproduction which includes a not-shown magnetoresistive element having layers laminated in such a manner that a non-magnetic layer is sandwiched between a pair of magnetic layers. The magneto resistive element is disposed so that a side surface of the laminated layers (a surface parallel to a direction in which the non-magnetic layer and the pair of magnetic layers are laminated) faces a surface of the magnetic recording medium 2. Although a so-called TMR (tunneling magnetoresistive) element is used herein as a magnetoresistive element, the magnetoresistive element is not limited thereto. Other magnetoresistive elements may be used, such as a GMR element.

As shown in FIG. 3, the recording head 23 includes a metal wire 23a which is a thin-line structure having a U-shape narrow portion bended at a substantially central part of the surface facing the magnetic recording medium 2 (in FIG. 3, under surface of the recording head 23). To this metal wire 23a is supplied high-frequency signal current, which is recording current corresponding to information to be recorded, and thereby a magnetic field is generated around the metal wire 23a. The magnetic field has a large magnitude in the vicinity of the U-shape portion which has high current density because of being narrower than the other portions. The direction of the magnetic field generated in the vicinity of the U-shape portion depends on a direction of current flowing through the U-shape portion.

As a material for the slider 21, AlTiC or the like may be used. As a material for the gradient index lens 24, a glass material, polymer material, or the like may be used. As a material for semiconductor laser element 25, there may be used GaAs (capable of generating red laser light with an emission wavelength of 650 nm), GaN (capable of generating bluish-purple laser light with an emission wavelength of 405 nm).

The magnetic head 1 having the above-described structure can be formed using a known sputtering method, etching techniques, or the like.

The magnetic recording medium 2 is a medium designed for heat-assisted magnetic recording/reproducing. As a magnetic layer of the magnetic recording medium 2, there may be used an antiferromagnetic substance such as TbFeCo, CoCrPt series, rare-earth transition metal, FePt series, and RhFe series.

The controller 12 includes a CPU, a program ROM, and a RAM, which are not shown. The CPU is connected to the program ROM and the RAM, and these constitute a so-called microcomputer. The program ROM stores therein a plurality of commands and programs such as control data. Triggered by the satisfaction of a predetermined condition, each command is invoked from the program ROM by the CPU to be loaded into the RAM. Then, each command loaded into the RAM is fed, at a predetermined timing, from the controller 12 to a member subjected to control, e.g., the motor driver 8 or the laser driver 11. In the microcomputer, there are formed: a preliminary recording unit 13; a judgment unit 14; an extraction unit 15; a drive condition determining unit 16; a preliminary recording terminating unit 17; and a storage unit 18.

In response to an instruction from the extraction unit 15, the preliminary recording unit 13 exerts control so that constant current or current with a constant amplitude waveform is applied to the recording head 23, and simultaneously drives, via the laser driver 11, the semiconductor laser element 25 in accordance with a preliminary drive condition, in order that heating power is provided by the semiconductor laser element 25 to a preliminary recording area of the magnetic recording medium 2. Thereby, the preliminary recording unit 13 preliminarily records information onto the preliminary recording area of the magnetic recording medium 2. Where the preliminary recording area is provided will be described later.

In response to an instruction from the extraction unit 15, the judgment unit 14 obtains a reproduction signal evaluation value resulting from a reproduction signal obtained through reproduction, by the reproducing head 22, of information which has been recorded by the preliminary recording unit 13 onto the preliminary recording area of the magnetic recording medium 2. Then, the judgment unit 14 judges which one of the reproduction signal evaluation value and a predefined reference value is superior to the other.

The extraction unit 15 controls the preliminary recording unit 13 and the judgment unit 14 to extract a preliminary drive condition that satisfies a predetermined condition. Specifically, the extraction unit 15 controls the preliminary recording unit 13 and the judgment unit 14 so that preliminary recording of information onto the preliminary recording area is conducted by the preliminary recording unit 13 once or multiple times using a different preliminary drive condition each time, until the judgment unit 14 produces a judgment result indicating that the reproduction signal evaluation value is in agreement with or superior to the reference value. Then, the extraction unit 15 extracts a preliminary drive condition of the semiconductor laser element 25, corresponding to the judgment result by the judgment unit 14 indicating that the reproduction signal evaluation value is in agreement with or superior to the reference value. In addition, the extraction unit 15 stores the reproduction signal evaluation value or the like, in the storage unit 18.

The drive condition determining unit 16 determines that the preliminary drive condition extracted by the extraction unit 15 is a drive condition of the semiconductor laser element 25, which is used when information is recorded onto the magnetic recording medium 2.

The preliminary recording terminating unit 17 controls the extraction unit 15 so that the preliminary recording unit 13 conducts no more preliminary recording after heating power provided to the preliminary recording area reaches a predetermined upper limit.

The storage unit 18 stores therein: the reproduction signal evaluation value derived by the judgment unit 14; the preliminary drive condition extracted by the extraction unit 15; and the drive condition determined by the drive condition determining unit 16.

Figure 4:
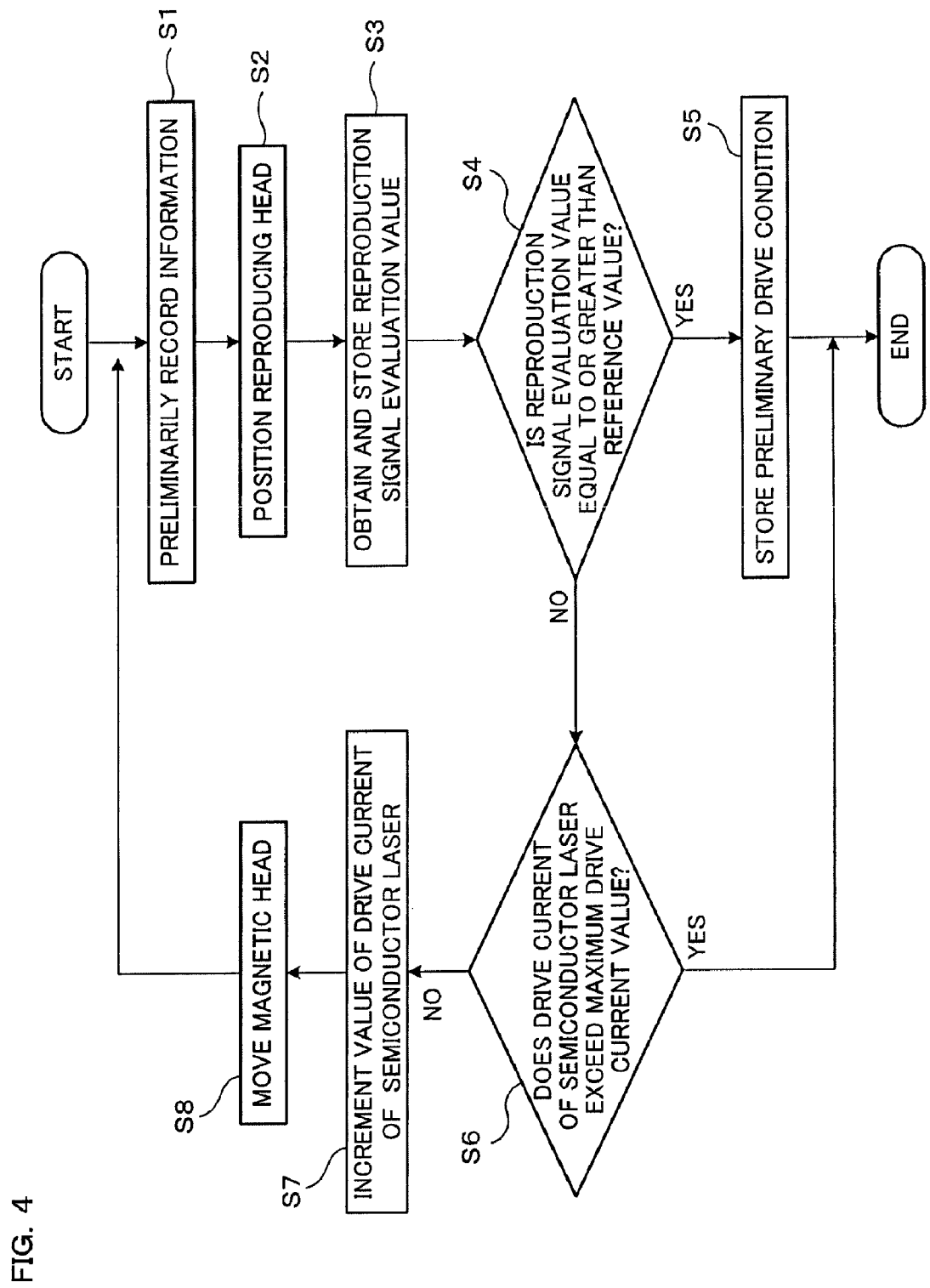
FIG. 4 A flow chart of the operation of the magnetic recording/reproducing apparatus illustrated in FIG. 1.

The following describes the operation process of the magnetic recording/reproducing apparatus 100 of this embodiment, with reference to FIG. 4.

First, in step S1, while the magnetic recording medium 2 is rotated and the recording head 23 is above the preliminary recording area, the preliminary recording unit 13 which has received an instruction from the extraction unit 15 feeds current to the metal wire 23a of the recording head 23, and conducts a laser light application step, in which drive current in accordance with a preliminary drive condition is supplied to the semiconductor laser element 25 thereby causing the semiconductor laser element 25 to emit laser light 26.

Figure 5A:
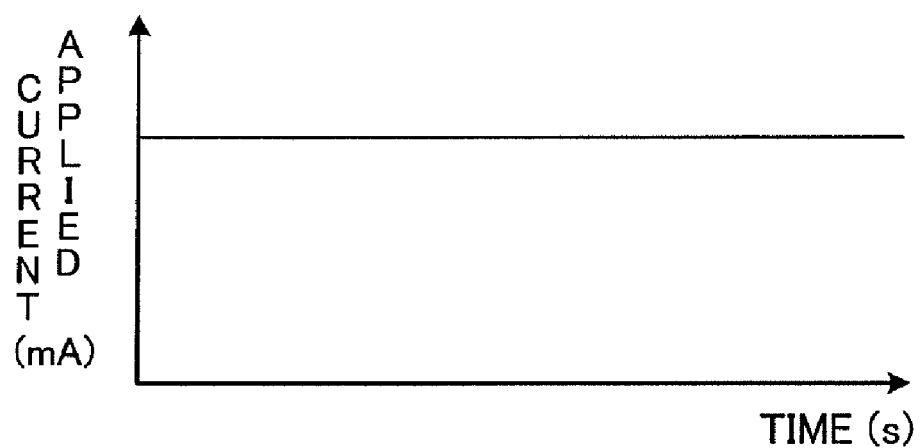
FIG. 5(a) A graph showing an example of a current signal applied to a metal wire of a recording head.
Figure 5B:
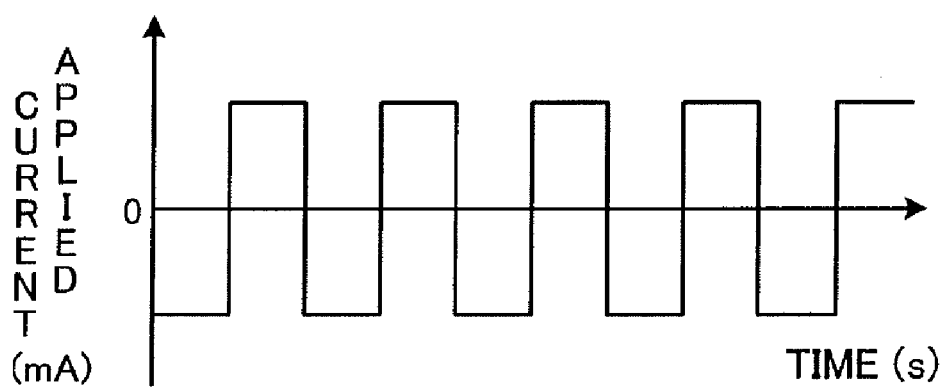
FIG. 5(b) A graph showing another example of a current signal applied to the metal wire of the recording head.

In other words, in the step S1, current is fed to the metal wire 23a of the recording head 23a, and thereby recording magnetic field is generated around the metal wire 23a. Here, recording current fed to the metal wire 23a is current as shown in FIG. 5(a), or current as shown in FIG. 5(b). The current shown in FIG. 5(a) is a constant current signal having a constant positive current value. The current shown in FIG. 5(b) is rectangular-wave current which has a constant amplitude and a constant high frequency and is alternately switched between positive and negative. Note that, the signal shown in FIG. 5(b) may have another shape as long as it is current with a constant amplitude waveform. Since the current as shown in FIG. 5(a) or 5(b) is fed to the recording head 23 as recording current, a recording magnetic field generated by the recording head 23 has a constant magnitude over the preliminary recording area. To be exact, in each of the cases shown in FIGS. 5(a) and 5(b), the magnitude of the recording magnetic field transiently varies during rising and falling in the waveform of the recording current. However, only the portions of the current waveform each having maximum current value are substantially involved in the recording of the signal. Therefore, it is possible to regard the magnitude of the recording magnetic field as being constant.

In the step S1, current is fed to the metal wire 23a of the recording head 23; and simultaneously the semiconductor laser element 25 is driven at drive current in accordance with the preliminary drive condition, so that the laser light 26 is applied to the metal wire 23a. At the time of first execution of the step S1, a predefined initial preliminary drive condition is used. As shown in FIG. 3, the semiconductor laser element 25 emits laser toward the recording head 23. At this time, the laser light 26 is focused by the gradient index lens 24 and then emitted to the recording head 23. When the laser light 26 is applied to the metal wire 23a, localized light which is called near-field light is generated below the under surface of the metal wire 23a facing the magnetic recording medium 2. With this localized light, the preliminary recording area of the magnetic recording medium 2 is heated. Thus, using a magnetic field generated by the metal wire 23a of the recording head 23 and the heating action by the localized light onto the magnetic recording medium 2, information indicating a direction of magnetization of the magnetic recording medium 2 is preliminarily recorded, in the manner of heat-assisted magnetic recording, onto the preliminary recording area of the magnetic recording medium 2.

Figure 6:
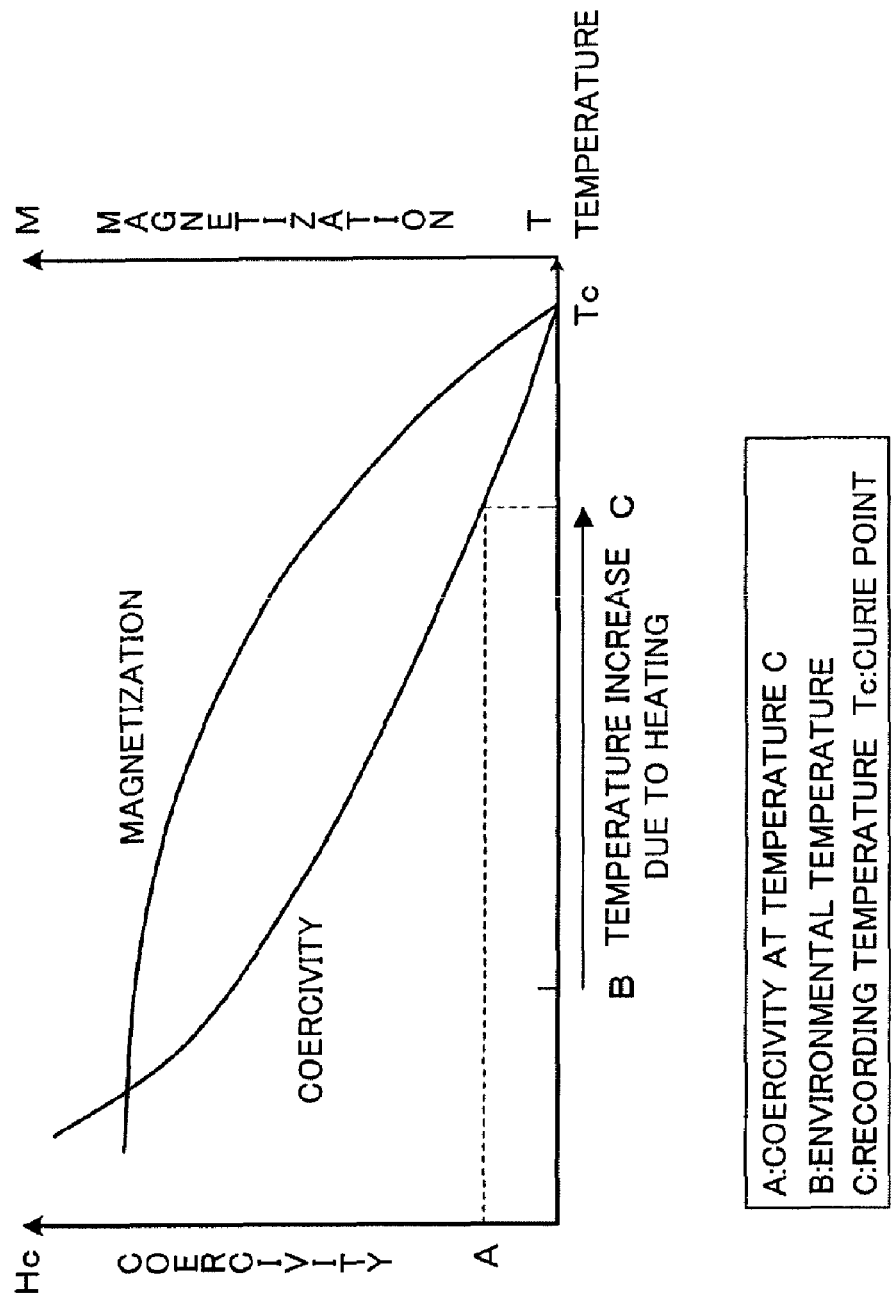
FIG. 6 A graph showing an example of a relation among coercivity, magnetization, and temperature, of a magnetic recording medium.

That is, when a recording magnetic field is applied to the magnetic recording medium 2 by the recording head 23, the temperature of the magnetic recording medium 2 is increased by the near-field light generated using the semiconductor laser element 25. After the temperature is increased to a value at which the coercivity of the magnetic recording medium 2 is equal to the intensity of the recording magnetic field, information which depends on a direction of current flowing through the metal wire 23a is preliminarily recorded onto the magnetic recording medium 2 (see FIG. 6).

The relation between coercivity and temperature in the magnetic recording medium 2 varies depending on the material and composition of a magnetic layer used for the magnetic recording medium 2. However, this relation does not change over time. Therefore, assuming that a recording magnetic field is constant, the lowest temperature of the magnetic recording medium 2 which allows information to be recorded is substantially constant. The amount of near-field light required for recording information onto the magnetic recording medium 2 may be small at high environmental temperatures. However, at low environmental temperatures, a larger amount of near-field light is needed. Therefore, the drive current of the semiconductor laser element 25 has to be adjusted in accordance with environmental temperature.

In this embodiment, recording current is applied to the metal wire 23a of the recording head 23 at approximately same time of applying drive current to the semiconductor laser element 25, that is, the recording current and the drive current are applied at approximately same time. However, the time for supplying the drive current to the semiconductor laser element 25 may be set earlier than the time for supplying the recording current to the metal wire 23a of the recording head 23, anticipating that: there is a little time lag between the supply of the drive current to the semiconductor laser element 25 and the output of the laser light; and there is a little time lag between the application of the laser light having heating power to the magnetic recording medium 2 and the increase in temperature of the magnetic recording medium 2.

In the step S1, a period of time during which the recording current is applied to the metal wire 23a of the recording head 23, and a period of time during which the drive current is supplied to the semiconductor laser element 25, each varies depending on an attribute of a reproduction signal, which is employed as a later-mentioned reproduction signal evaluation value. When the amplitude of a reproduction signal is employed as a reproduction signal evaluation value, the number of bits needed for evaluating the reproduction signal may be small, and so the above-mentioned periods may be short. Meanwhile, when Bit Error Rate is employed as a reproduction signal evaluation value, the number of bits needed is larger, and so those periods have to be longer.

The value of the drive current supplied to the semiconductor laser element 25 is set, so as to be small enough to prevent the magnetic recording medium 2 from being damaged by overheating, but so as to exceed a threshold current of the semiconductor laser element 25. Therefore, heating of the preliminary recording area is started with relatively small heating power.

Next, in step S2, based on an instruction from the controller 12, the reproducing head 22 is positioned. That is, in the step S2, the current applied to the metal wire 23a of the recording head 23 and the drive current for the semiconductor laser element 25 are turned off, and the reproducing head 22 is positioned at a location within the preliminary recording area, at which information has been preliminarily recorded in the step S1.

Then, in step S3, in response to an instruction from the extraction unit 15, the judgment unit 14 obtains a reproduction signal evaluation value and stores the value. That is, in the step S3, a signal obtained from the location where information has been preliminarily recorded in the step S1 is reproduced by the reproducing head 22 provided to the magnetic head 1, and a reproduction signal evaluation value is obtained from the signal. In addition, in the step S3, the thus obtained reproduction signal evaluation value is stored in the storage unit 18. Note that, as a reproduction signal evaluation value, there may be used the amplitude of a reproduction signal, Bit Error Rate (BER), estimated Bit Error Rate based on SAM (Sequenced Amplitude Margin), and the like.

Subsequently, in step S4, in response to an instruction from the extraction unit 15, the judgment unit 14 judges whether the reproduction signal evaluation value obtained in the step S3 is equal to or greater than the reference value. When, it is judged in this judgment step that the reproduction signal evaluation value is equal to or greater than the reference value (S4: YES), the preliminary drive condition corresponding to that value is stored in the storage unit 18 in step S5, based on an instruction from the controller 12. Then the process ends. The preliminary drive condition stored in the storage unit 18 here is determined as a drive condition of the semiconductor laser element 25 by the drive condition determining unit 16.

The drive condition of the semiconductor laser element 25 determined in the step S5 is used when information that a user desires to record is recorded at a location, which is at a substantially same distance from the center as the location within the preliminary recording area where the preliminary recording has been conducted. This is because, linear velocity is identical at the locations each having a same distance from the center, and the same drive condition is applicable to each location having the same linear velocity. That is, in this embodiment, the preliminary recording area extends in the radial direction of the magnetic recording medium 2 and has a radius substantially same as that of the medium 2.

When it is judged that the reproduction signal evaluation value is not equal to or not greater than the reference value in the above judgment step (S4: NO), the process proceeds to step S6. In the step S6, the preliminary recording terminating unit 17 judges whether the value of the drive current of the semiconductor laser element 25 in the step S1 exceeds a maximum drive current value, which is predefined in order to prevent overheating of the magnetic recording medium 2. Note that the "maximum drive current value" will be detailed later.

"A reproduction signal evaluation value is equal to or greater than the reference value" does not refer to the quantitative relation in values between the reproduction signal evaluation value and the reference value, but it means that "a reproduction signal corresponding to the reproduction signal evaluation value is equal or superior, in quality, to a reproduction signal corresponding to the reference value." Herein, "a reproduction signal evaluation value is equal to or greater than the reference value" may be expressed as "a reproduction signal evaluation value is in agreement with or superior to the reference value".

More specific description will be given. In the case where the amplitude of a reproduction signal is used as a reproduction signal evaluation value, a predetermined amplitude is set as a reference value. The process proceeds to the step S5 when the amplitude of an obtained reproduction signal (used as the reproduction signal evaluation value) is equal to or greater than the reference value. Meanwhile, the process proceeds to the step S6 when the amplitude is less than the reference value. Alternatively, in the case where Bit Error Rate is used as a reproduction signal evaluation value, a predetermined Bit Error Rate is set as a reference value. The process proceeds to the step S5 when the Bit Error Rate of an obtained reproduction signal (used as a reproduction signal evaluation value) is equal to or greater than the reference value. Meanwhile, the process proceeds to the step S6 when that Bit Error Rate is less than the reference value. Furthermore, in the case where PRML (Partial Response maximum Likelihood) is used as a bit detection method, an evaluation value obtained through the evaluation method called SAM (Sequenced Amplitude Margin) may be used as a reproduction signal evaluation value. In this case, an estimated value of Bit Error Rate is produced using this evaluation method called SAM. Therefore, the process may be proceeded with, in the same way as in the above-mentioned case where Bit Error Rate is used as a reproduction signal evaluation value.

When it is judged that the drive current of the semiconductor laser element 25 used in the step S1 exceeds the maximum drive current value in the step S6 (S6: YES), the preliminary recording terminating unit 17 controls the extraction unit 15 so that no more preliminary recording is conducted by the preliminary recording unit 13 and the process ends. When it is judged that the drive current of the semiconductor laser element 25 used in the step S1 does not exceed the maximum drive current value (S6: NO), the process proceeds to step S7.

In the step S7, the preliminary recording unit 13 receives an instruction to increment, by a predetermined value, the value of the drive current of the semiconductor laser element 25 at the time of preliminary recording in the next cycle. In step S8, the recording head 23 is moved by the control block 7 to a location different from the last location at which near-field light is applied, and then the process returns to the step S1. These steps are repeatedly conducted until the process ends.

The reason why the recording head 23 is moved in the step S8 to a location different from the last location at which near-field light is applied is because the drive condition of the semiconductor laser element 25 is not defined at this point and so a signal recorded at the last location cannot not be erased. Therefore, it is preferable to erase all the signals recorded onto the preliminary recording area after the process flow of FIG. 4 ends and the drive condition of the semiconductor laser element 25 is determined. Erasing all the recorded signals makes it possible to reuse the locations at which the signals are recorded, next time a drive condition of the semiconductor laser element 25 is determined. Accordingly, an area used for determining a drive condition is kept to be small. This increases the area used to record user data, in the magnetic recording medium 2.

An upper limit and a lower limit of heating power provided by near-field light to the magnetic recording medium 2 (respectively corresponding to an upper limit and a lower limit of drive current of the semiconductor laser element 25) may be properly set, taking into consideration of an operating environmental temperature range of the magnetic recording/reproducing apparatus 100. An example is described below. The lower limit of the heating power is set to be slightly smaller than minimum heating power with which information is recordable onto the magnetic recording medium 2, when the temperature of the magnetic recording medium 2 sensed by a not-shown sensor reaches the highest temperature within the operating environmental temperature range. Meanwhile, when the temperature of the magnetic recording medium 2 reaches the lowest temperature within the operating environmental temperature range, the upper limit of the heating power is set to be slightly larger than maximum heating power used with which information is recordable onto the magnetic recording medium 2. To be more specific, when the temperature of the magnetic recording medium 2 reaches the highest temperature within the operating environmental temperature range, the lower limit of heating power is defined so as to be slightly smaller than minimum heating power with which information is able to be recorded at a location on the innermost circumference of the preliminary recording area of the magnetic recording medium 2. This is because, linear velocity is lowest at locations on the innermost circumference of the magnetic recording medium 2 rotating at a constant angular velocity, and magnetic recording medium 2 is most easily heated at these locations. On the other hand, when the temperature of the magnetic recording medium 2 reaches the lowest temperature within the operating environmental temperature range, the upper limit of heating power is defined so as to be slightly larger than maximum heating power with which information is able to be recorded at a location on the outermost circumference of the preliminary recording area of the magnetic recording medium 2. Then, the value of drive current of the semiconductor laser element 25 which corresponds to the upper limit of the heating power is set as a maximum drive current value.

According to the magnetic recording/reproducing apparatus 100 having the above-described structure, even if environmental temperature is changed, e.g., seasonally, it is possible to quickly obtain a preferable drive condition of the semiconductor laser element 25, under which the temperature of the magnetic recording medium 2 is adjusted to an intended temperature (e.g., a temperature falling within a range suitable for conducting recording onto the magnetic recording medium 2). As a result, it is possible to provide the magnetic recording/reproducing apparatus 100 capable of easily conducting heat-assisted magnetic recording without substantially affected by environmental temperature.

The apparatus is configured so that: heating power provided by the semiconductor laser element 25 to the preliminary recording area of the magnetic recording medium 2 gradually becomes larger as the number of times of preliminary recording is increased; and the process ends when a reproduction signal evaluation value becomes equal to or greater than a reference value. Therefore, it is possible to select a drive condition corresponding to minimum heating power, and to obtain a better drive condition more quickly.

In this embodiment, laser light 26 is applied to the metal wire 23a which constitutes a part of recording head 23, and therefore the metal wire 23a absorbs the laser light 26 to be heated. In addition, the magnetic head 1 is generally near the heated magnetic recording medium 2, spaced therefrom as close as approximately 10 nm. Accordingly, the metal wire 23a is heated by transferred heat or radiant heat from the magnetic recording medium 2, and as a result, the temperature of the metal wire 23a may be considerably increased. A large increase in temperature may cause fatigue phenomenon in the metal wire 23a, due to thermal stress generated along with a repeated rise and fall in temperature. In addition, such a large increase in temperature may possibly cause the metal wire 23a to be melted and broken. However, in this embodiment, a drive condition of the semiconductor laser element 25 is determined so as to prevent overheating of the magnetic recording medium 2, and drive current for the semiconductor laser element 25 is decreased at high environmental temperatures. Accordingly, it is possible to restrain such an increase in temperature of the metal wire 23a. As a result, overheating of the metal wire 23a is prevented, and thereby it is possible to give a longer life to the recording head 23, and to prevent the breakage of the recording head 23.

Moreover, the preliminary recording terminating unit 17 controls the extraction unit 15 so that the preliminary recording unit 13 conducts no more preliminary recording after the drive current of the semiconductor laser element 25 reaches the maximum drive current value. This further ensures that the overheating of the magnetic recording medium 2 is prevented, and thereby it is possible to prevent the damage to the magnetic recording medium 2.

In the case where the temperature of the semiconductor laser element 25 is likely to increase due to high environmental temperatures, the drive current is decreased. With this, it is possible to restrain heat production by the semiconductor laser element 25. The semiconductor laser element 25 emits laser light in accordance with the magnitude of applied drive current. However, energy that is not converted to light energy is converted to heat, which causes the semiconductor laser element 25 to produce heat. Then, as the temperature of the semiconductor laser element 25 is increased, characteristic relation between drive current and light output is changed, and a value of drive current per unit light output becomes larger. Therefore, it is preferable to determine the value of drive current and the time-interval of preliminary recording so that the increase in temperature of the semiconductor laser element 25 is restrained to be as small as possible, taking into consideration of: power consumption; and a possibility of a change in shape of the recording head 23 and the reproducing head 22 due to the heat.

Generally, the magnitude of a magnetic field generated by the recording head 23 is close to its saturation magnetic field. In this embodiment, the maximum magnitude of the magnetic field depends on maximum current value applicable to the metal wire 23a. Here, the maximum current value applicable to the metal wire 23a is the current value with which the temperature of the metal wire 23a is increased to a value at which the metal wire 23a is melted by Joule heat. However, irrespective of the structure of a recording head, there is a limit in the magnitude of a magnetic field that can be generated by the recording head. Under such a circumstance, this embodiment is advantageous. In this embodiment, an extracted optimum preliminary drive condition is determined as a drive condition of the semiconductor laser element 25. Therefore, compared with a known art, in which the semiconductor laser element 25 is driven under a given drive condition, an increase in temperature of the semiconductor laser element 25 is restrained, and thereby deterioration of the semiconductor laser element 25 is restrained. Accordingly, it is possible to provide much longer life to the semiconductor laser element 25.

Furthermore, in this embodiment, the semiconductor laser element 25, which is a light-emitting element, is used as apart of heat means for heating the magnetic recording medium 2; and the magnetic recording medium 2 is heated by near-field light applied to the magnetic recording medium 2. Therefore, it is possible to improve the frequency of repeatedly changing heating and non-heating, and thereby to improve recording rate. For example, if a coil made of a metal material, which produces heat as a result of applying current, is used as heat means, a period of time is needed for cooling the coil whose temperature has been increased, and therefore it is difficult to improve the recording rate. On the other hand, in this embodiment, the semiconductor laser element 25 constitutes a part of the heat means, and this structure enables higher-speed recording. Furthermore, with the structure of this embodiment, the magnetic recording medium 2 is directly heated by near-field light generated below the metal wire 23a. Accordingly, it is possible to heat the magnetic recording medium 2 more efficiently.

In the case where the magnetic recording medium 2 is heated by the use of a light-emitting element like the semiconductor laser element 25, the temperature of the magnetic recording medium 2 may reach an unintended value, affected by not only environmental temperature but also an amount of light emitted from the light-emitting element, i.e., heating power. The relation between current supplied to the light-emitting element and the amount of emitted light depends on the temperature of the element, that is, environmental temperature. Therefore, under high environmental temperatures, there is a possibility that the magnetic recording medium may be damaged by overheating. In order to avoid this problem, it is important to provide a light-amount monitor. However, with the structure of this embodiment, overheating of the magnetic recording medium 2 is prevented, and therefore such a light-amount monitor does not have to be provided.

Furthermore, in this embodiment, the magnetic recording medium 2 is heated by near-field light which is generated as a result of applying light emitted from the semiconductor laser element 25 to the metal wire 23a. This makes it possible to heat a smaller area, thereby improving recording density.

In the field of magnetic recording/reproducing apparatuses, there is a problem phenomenon. That is, along with an increase in temperature, an outer shape of the recording head and/or the reproducing head is/are changed due to expansion, and the recording head and/or the reproducing head is/are protruded from a surface of the slider which faces the recording medium. Such a phenomenon is called "Thermal Protrusion of Pole". At present, the flying height of a magnetic head is approximately 10 nm, and therefore such a protrusion affects recording or reproducing even though the protrusion is a few nm. This embodiment employs, as a light source, the semiconductor laser element 25 which is integrally formed with the magnetic head 1. In addition, the semiconductor laser element 25 is located laterally from the slider 21, and the recording head 23 is formed below the semiconductor laser element 25. Therefore, temperature is not evenly increased across the whole slider 21, but uneven distribution of temperature is presented. That is, a light-emitting portion of the semiconductor laser element 25 acting as a light source is expanded due to an increase in temperature, leading to thermal protrusion of the recording head 23. Therefore, it is preferable to keep the temperature increase of the semiconductor laser element 25 as small as possible. As described above, this embodiment is configured so that light output from the semiconductor laser element 25 is adjusted to be smaller under high environmental temperatures. Accordingly, it is possible to keep the temperature increase of the semiconductor laser element 25 to be smaller.

First Modification of the First Embodiment

Figure 7:
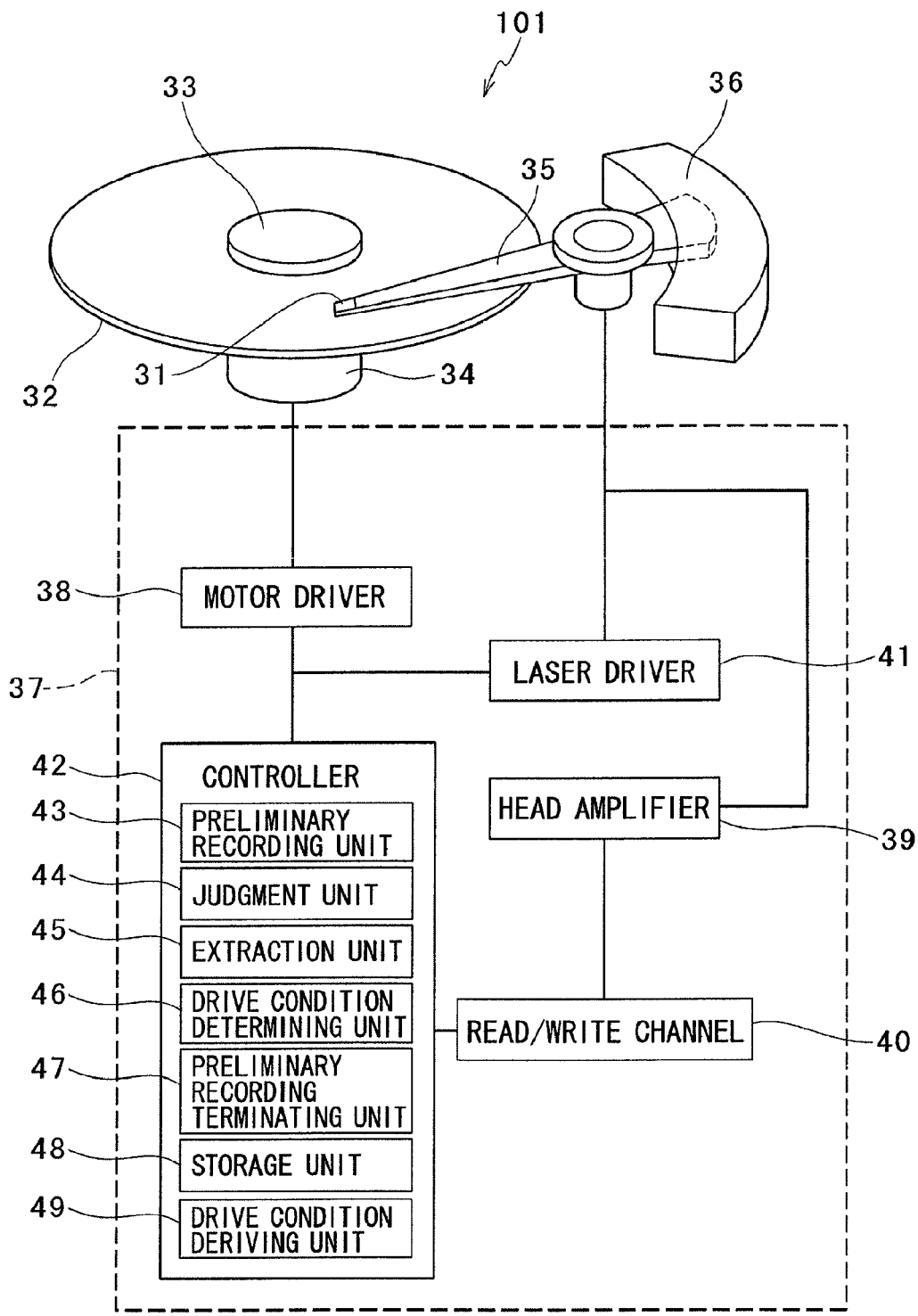
FIG. 7 A schematic view of a magnetic recording/reproducing apparatus of a first modification of the first embodiment of the present invention.
Figure 8:
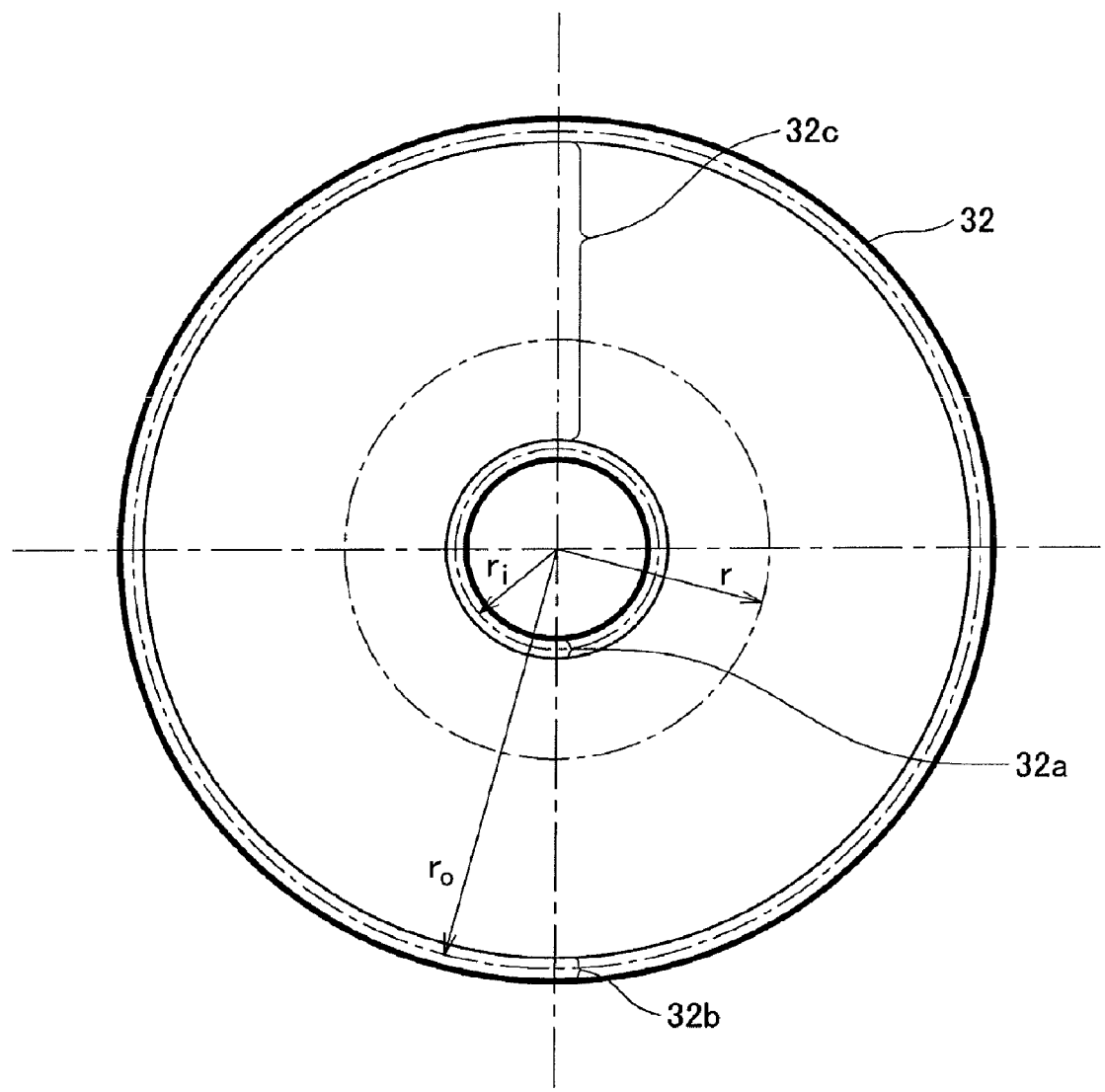
FIG. 8 A plan view showing a magnetic recording medium of the magnetic recording/reproducing apparatus illustrated in FIG. 7.

The following describes a magnetic recording/reproducing apparatus 101 of a first modification of the first embodiment of the present invention, with reference to FIGS. 7 and 8. Note that, hereinafter, members identical with the members 1 to 18 in the first embodiment are respectively numbered as 31 to 48 and the descriptions thereof may be omitted.

The magnetic recording/reproducing apparatus 101 of this modification is different from that of the first embodiment, in that a drive condition deriving unit 49 is included, which determines a drive condition corresponding to a location at a distance r from the center of a magnetic recording medium 32 (hereinafter the location is referred to as "radial location r"), according to the below equation (A).

$$Pr=Pi+(r-ri)\times(Po-Pi)/(ro-ri) \quad (A)$$

In the equation (A), ri represents a radial location within a preliminary recording area 32a, which is provided near the innermost circumference of the magnetic recording medium 32, as shown in FIG. 8. In the meantime, ro represents a radial location within a preliminary recording area 32b, which is provided near the outermost circumference of the magnetic recording medium 32. Pi represents heating power provided to the radial location ri by a semiconductor laser element 25, which is driven under a drive condition determined by a drive condition determining unit 46. Po represents heating power provided to the radial location ro by the semiconductor laser element 25, which is driven under a drive condition determined by the drive condition determining unit 46. Pr represents optimum heating power for recording information at an arbitrary radial location r within a user recording area 32c interposed between the preliminary recording area 32a and the preliminary recording area 32b of the magnetic recording medium 32. Pi and Po each may be an actual measured value, or may be a value obtained from a simulation, based on a drive condition determined by the drive condition determining unit 46.

Strictly speaking, there exist a plurality of recording tracks in each of the preliminary recording areas 32a and 32b, and each preliminary recording area 32a, 32b has a width. However, each pitch between recording tracks is as small as about 25 nm. Therefore, even if 100 recording tracks are used for each preliminary recording area, the width thereof is 2.5 μm, and so the difference in linear velocity can be ignored. There is no need to concern which of the radial locations within each preliminary recording area 32a, 32b is regarded as a representative radial location of each preliminary recording area 32a, 32b. This is because, while the width of each preliminary recording area 32a, 32b is a few μm, the width of the user recording area 32c, for which heating power Pr should be calculated, is generally a few mm, which means that there is a big difference between them. Accordingly, within each preliminary recording area 32a, 32b, an arbitrary radial location may be regarded as each radial location thereof. In this modification, a point midway between the inner and outer circumferences of each preliminary recording area 32a, 32b is regarded as each radial location.

The following describes the operation of the magnetic recording/reproducing apparatus 101 of this modification. The operation of the magnetic recording/reproducing apparatus 101 is different from that of the first embodiment, in the below-described respect only.

Since the magnetic recording medium 32 is controlled so as to rotate at a constant angular velocity, as is in the first embodiment, linear velocity differs depending on a radial location r at which information is recorded. To be more specific, when a 3.5 inch magnetic recording medium 32 is rotated at the number of revolutions of 7600 rpm, the linear velocity at the innermost circumference is approximately 10 m/s, while the linear velocity at the outermost circumference is approximately 38 m/s. This means that the linear velocity at the outermost circumference is about four times that at the innermost circumference. On the other hand, in order to record information, it is necessary to increase the temperature of the magnetic recording medium 32 so that the temperature of the radial location where information is to be recorded is increased to a predetermined temperature. Since linear velocity varies with radial location, heating power required to increase the temperature to the predetermined value is different, for each of two locations different in radial location. However, in fact, it is difficult to determine a drive condition of the semiconductor laser element 25 for every radial location within the user recording area 32c, in accordance with the first embodiment. Therefore, in this modification, first determined are: a drive condition of the semiconductor laser element 25, which is used in the preliminary recording area 32a covering the radial location ri; and a drive condition of the semiconductor laser element 25, which is used in the preliminary recording area 32b covering the radial location ro, in accordance with the first embodiment. After that, the drive condition deriving unit 49 conducts a calculation process using the equation (A) to obtain heating power Pr. Then, based on the obtained Pr, the drive condition deriving unit 49 determines a drive condition of the semiconductor laser element 25, which is used at an arbitrary radial location r within the user recording area 32c.

The equation (A) uses a feature that there is an approximate linear relation between radial location r, i.e., linear velocity, and heating power. This means that, for example, when an output of the semiconductor laser needed for a linear velocity of 10 m/s is 5 mW, an output of the semiconductor laser needed for a linear velocity of 20 m/s is 10 mW.

This modification provides advantageous effects similar to those in the first embodiment, as well as the following advantageous effect. It is possible to easily obtain a drive condition of the semiconductor laser element 25, which is used when information is recorded at an arbitrary radial location r within the user recording area 32c, in a short time, through calculation, except that preliminary recording is conducted twice.

It is preferable to respectively provide the preliminary recording area 32a and the preliminary recording area 32b near the innermost and outermost circumferences of a recordable area of the magnetic recording medium 32. However, such a configuration is not necessarily required in this modification. Each of the preliminary recording areas 32a and 32b may be situated anywhere within a recordable area of the magnetic recording medium 32. For example, a user recording area, onto which a user records data, may be provided closer to the inner circumference than the preliminary recording area near the inner circumference is, and a user recording area may be provided closer to the outer circumference than the preliminary recording area near the outer circumference is. This configuration makes it possible to decrease the difference in linear velocity between the preliminary recording area near the inner circumference and the preliminary recording area near the outer circumference. Accordingly, it is possible to determine a drive condition of the semiconductor laser element 25 with higher accuracy.

Second Modification of the First Embodiment

Figure 9:
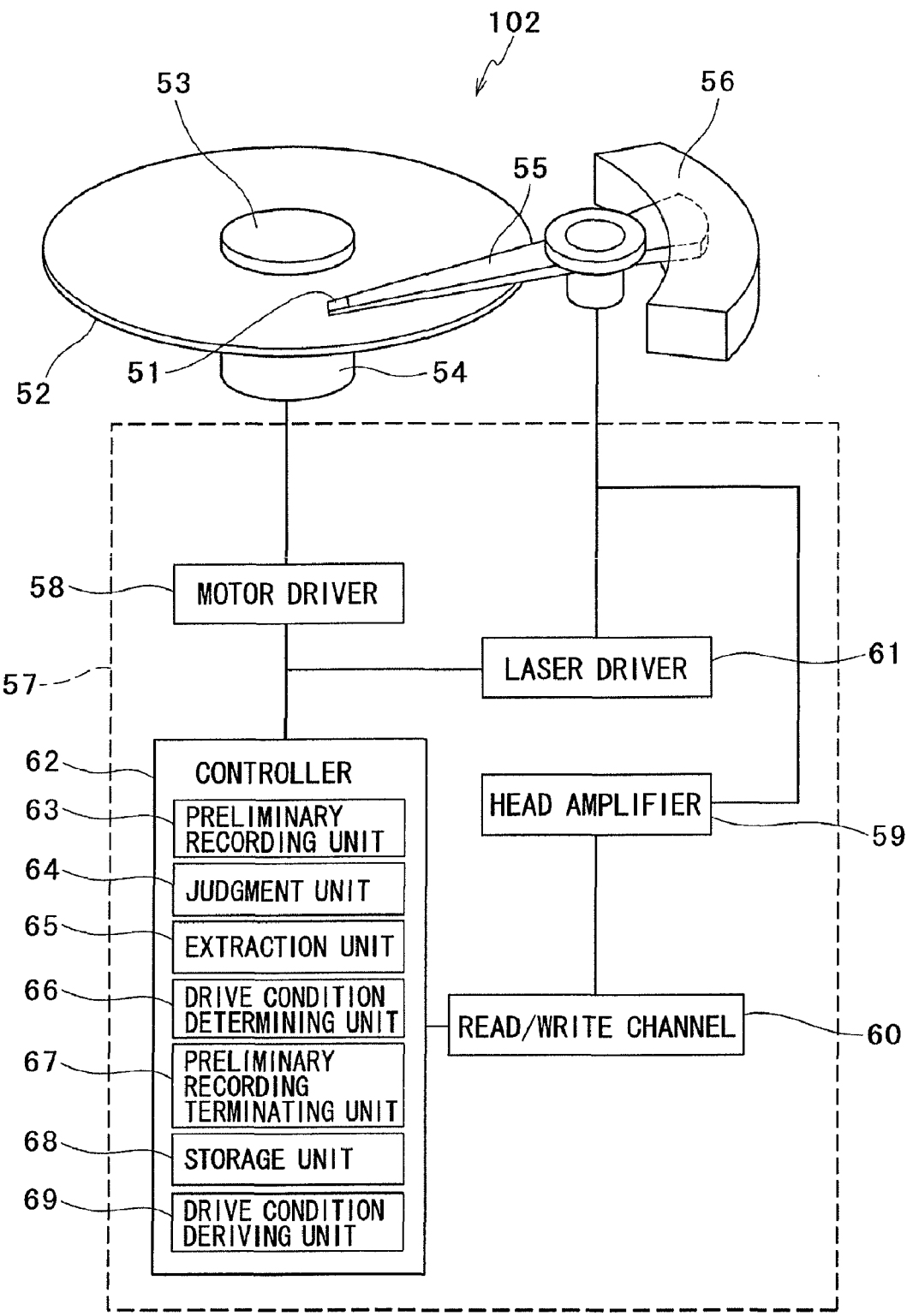
FIG. 9 A schematic view of a magnetic recording/reproducing apparatus of a second modification of the first embodiment of the present invention.
Figure 10:
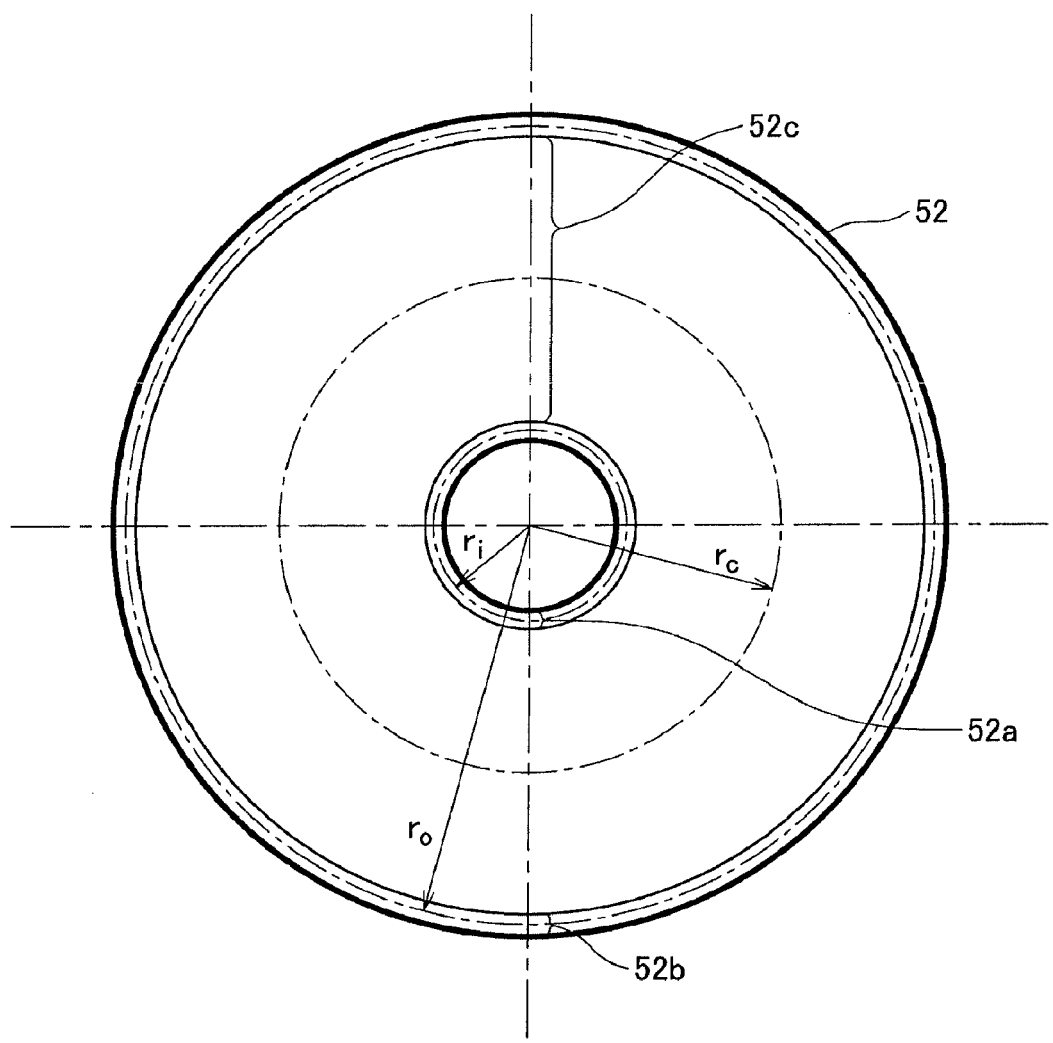
FIG. 10 A plan view showing a magnetic recording medium of the magnetic recording/reproducing apparatus illustrated in FIG. 9.

The following describes a magnetic recording/reproducing apparatus 102 of a second modification of the first embodiment of the present invention, with reference to FIGS. 9 and 10. Note that, hereinafter, members identical with the members 31 to 49 in the first modification of the first embodiment are respectively numbered as 51 to 69 and the descriptions thereof may be omitted.

The magnetic recording/reproducing apparatus 102 of this modification is configured as follows. First, (i) a drive condition of a semiconductor laser element 25, which is used in a preliminary recording area 52a covering radial location ri; and (ii) a drive condition of the semiconductor laser element 25, which is used in a preliminary recording area 52b covering radial location ro, are determined in accordance with the first embodiment. Here, the preliminary recording area 52a is provided near the innermost circumference of a magnetic recording medium 52; and the preliminary recording area 52b is provided near the outermost circumference of the magnetic recording medium 52. After that, a drive condition deriving unit 69 conducts a calculation process using the below-described equation (B), to obtain heating power Prc at radial location rc (see FIG. 10). The radial location rc is situated midway between the preliminary recording area 52a and the preliminary recording area 52b, that is, a distance from the center of the medium 52 to the radial location rc is an average of the distances of the two locations from the center (rc=(ri+ro)/2). Then, based on the obtained Prc, the drive condition deriving unit 69 derives a drive condition of the semiconductor laser element 25, which is used at the radial location rc. Then, the drive condition deriving unit 69 determines that the thus derived drive condition of the semiconductor laser element 25 is the drive condition of the semiconductor laser element 25, which is used when information is recorded at an arbitrary radial location within a user recording area 52c.

$$Prc = Pi + (rc - ri) \times (Po - Pi)/(ro - ri) \qquad (B)$$

This modification provides advantageous effects similar to those in the first embodiment and the first modification thereof, as well as the following advantageous effect: it is possible to minimize the amount of data for drive conditions, and this allows the capacity of a storage unit 68 to be relatively small. As a result, cost reduction is achieved. In addition, once the drive condition deriving unit 69 determines a drive condition of the semiconductor laser element 25, no more calculation is needed to determine the drive condition of the semiconductor laser element 25 wherever information is recorded. Therefore, the amount of calculation needed is small.

Third Modification of the First Embodiment

Figure 11:
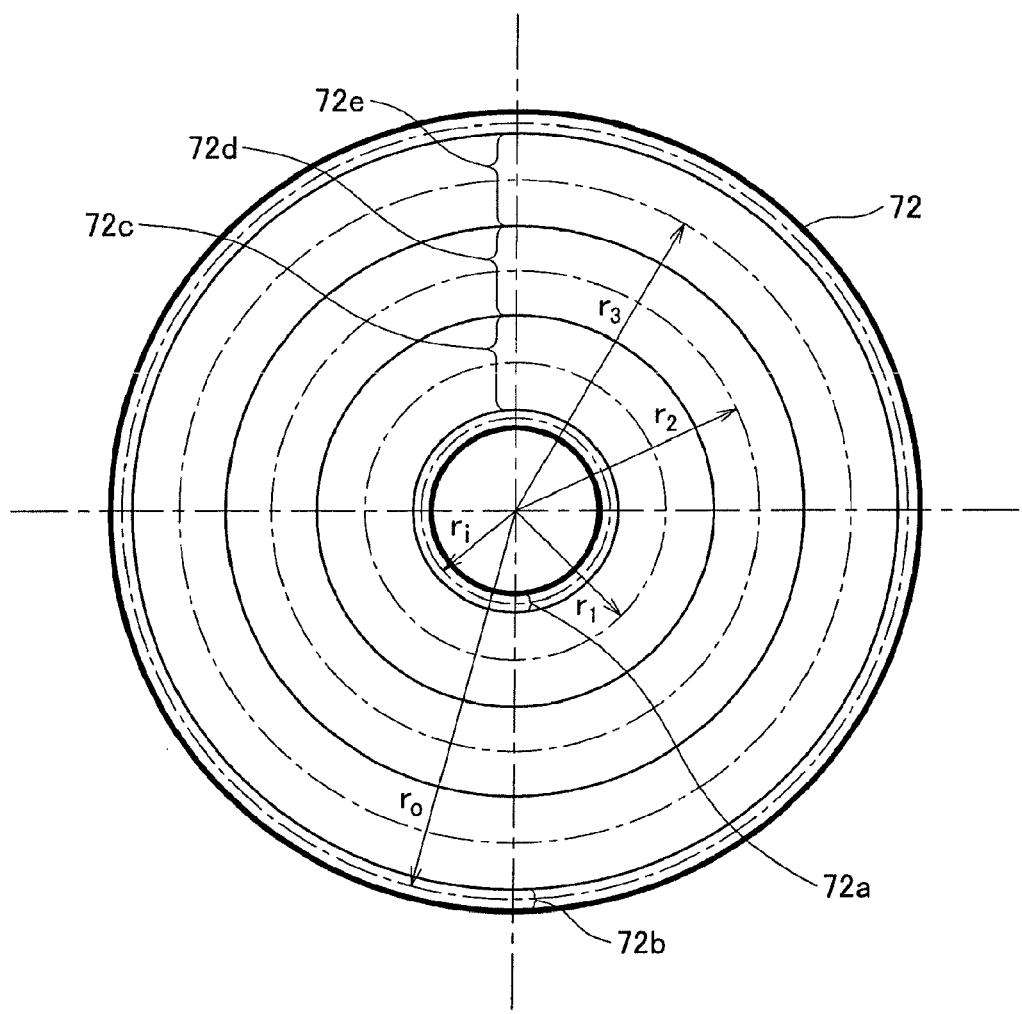
FIG. 11 A plan view showing a magnetic recording medium of a magnetic recording/reproducing apparatus of a third modification of the first embodiment of the present invention.

The following describes a magnetic recording/reproducing apparatus of a third modification of the first embodiment of the present invention, with reference to FIG. 11. Note that, hereinafter, descriptions of members identical with the members in the first embodiment and the first and second modifications thereof may be omitted.

The magnetic recording/reproducing apparatus of this modification has substantially same structure as that of the second modification of the first embodiment, except the two differences described below. The first difference is that, as shown in FIG. 11, a magnetic recording medium 72 is provided with, in addition to a preliminary recording area 72a covering radial location ri and a preliminary recording area 72b covering radial location ro, three zones (user recording areas) 72c, 72d, and 72e, which does not overlap one another in a radial direction, and in each of which zones, an internal transfer rate is constant. The second difference is that, instead of the drive condition deriving unit 69 of the second modification, another drive condition deriving unit is included. The drive condition deriving unit of this modification obtains, by using the below equation (C), heating powers Pr1, Pr2, and Pr3 which respectively correspond to radial locations r1, r2, and r3 situated midway in the respective zones with regard to the radial direction. Then, based on the obtained heating powers Pr1, Pr2, and Pr3, the drive condition deriving unit derives drive conditions of the semiconductor laser element 25 used when information is recorded at the radial locations r1, r2, and r3, respectively, and determines that each of the thus derived drive conditions is a drive condition of the semiconductor laser element 25 used at an arbitrary radial location within the associated zone. In FIG. 11, three concentric ring-shaped zones 72c, 72d, and 72e are provided between the preliminary recording area 72a and the preliminary recording area 72b. Note that, in FIG. 11, boundaries between zones of the three zones are depicted with solid lines; however, actually there is no boundary between adjacent zones.

$$Pr = Pi + (rz - ri) \times (Po - Pi)/(ro - ri) \qquad (C)$$

(z=1, 2, 3)

Each of the three ring-shaped zones 72c, 72d, and 72e is a user recording area which is used for a user. Each zone has a constant recording frequency. The recording frequency of each zone is set so that every zone has an approximately same linear recording density. Therefore, a zone closer to the inner circumference has a lower recording frequency.

The magnetic recording/reproducing apparatus of this modification provides advantageous effects similar to those in the first embodiment and the first and second modifications thereof, as well as the following advantageous effect. That is, since a drive condition of the semiconductor laser element 25 is determined with regard to each of the three zones 72c, 72d, and 72e, it is possible to heat a magnetic recording medium 2 using heating power suitable for each zone.

Although three zones are provided in the magnetic recording medium in this modification, this modification is not limited thereto. Two zones, or four or more zones may be provided in the magnetic recording medium. In addition, the zones may be different in width from one another.

Second Embodiment

Figure 12:
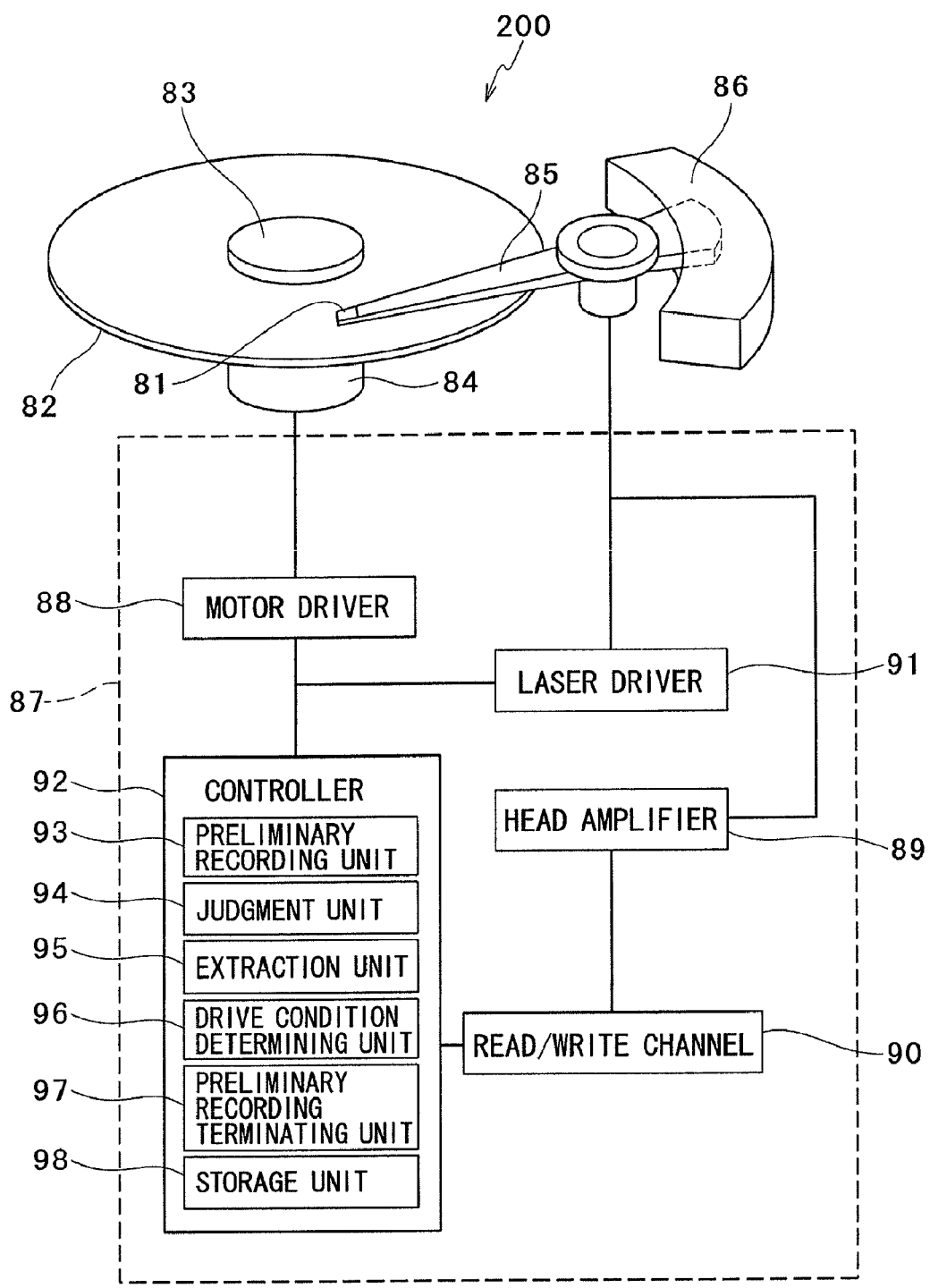
FIG. 12 A schematic view of a magnetic recording/reproducing apparatus of a second embodiment of the present invention.
Figure 13:
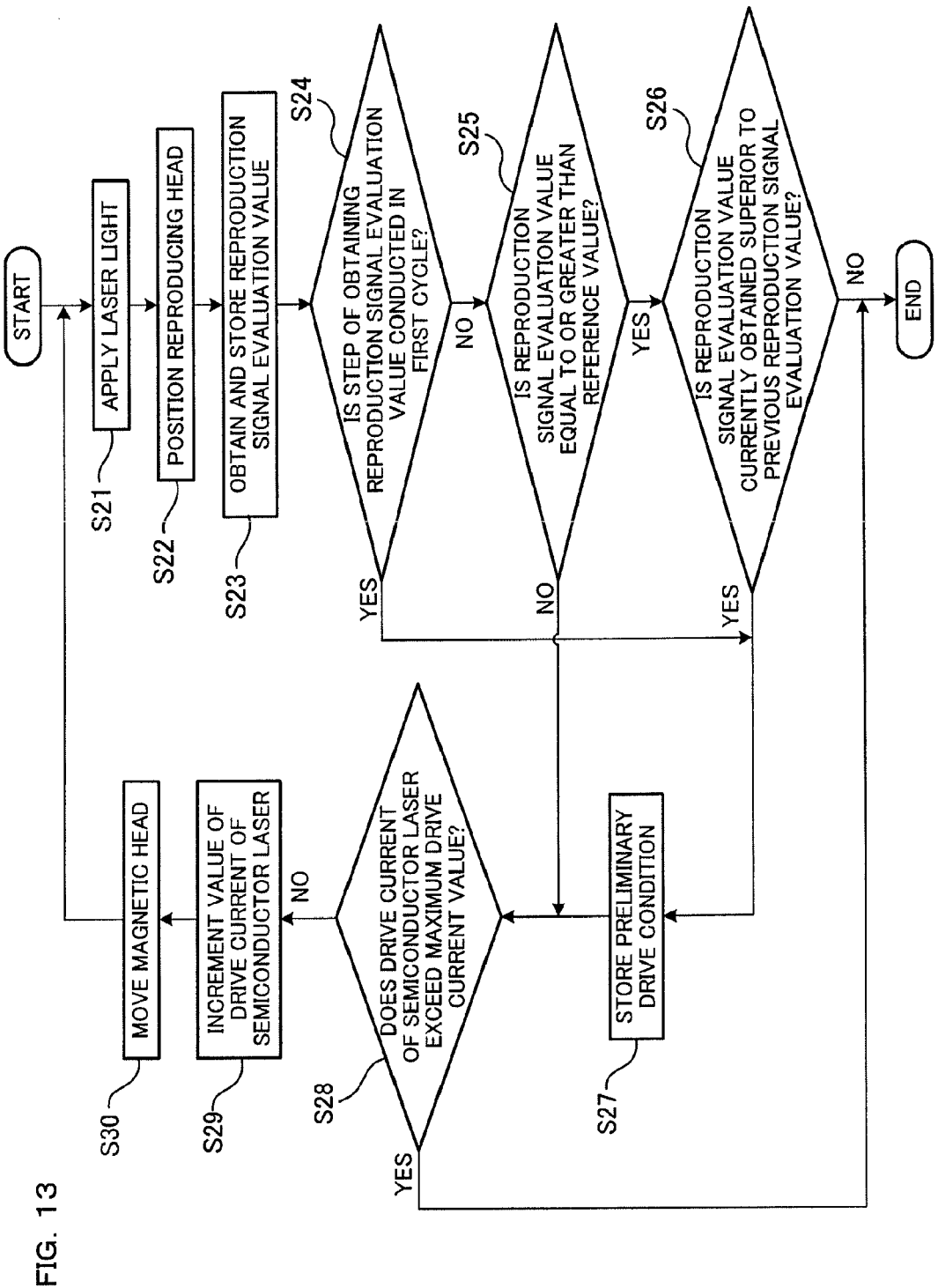
FIG. 13 A flow chart of the operation of the magnetic recording/reproducing apparatus illustrated in FIG. 12.

The following describes a magnetic recording/reproducing apparatus 200 of a second embodiment of the present invention, with reference to FIGS. 12 and 13. Note that, members identical with the members 1 to 18 in the first embodiment are respectively numbered as 81 to 98, and the description thereof may be omitted.

As shown in FIG. 12, the magnetic recording/reproducing apparatus of the second embodiment has a structure approximately same as that of the first embodiment, except the following difference. The difference is that an extraction unit 95 controls a preliminary recording unit 93 so that preliminary recording of information onto a recording area is conducted by the preliminary recording unit 93 multiple times using a different preliminary drive condition each time, and the extraction unit 95 extracts, from a plurality of preliminary drive conditions corresponding to the preliminary recording conducted multiple times, a preliminary drive condition corresponding to a reproduction signal evaluation value which: (i) has a judgment result by a judgment unit 94 indicating that the reproduction signal evaluation value is in agreement with or superior to a reference value; and (ii) is the best reproduction signal evaluation value among a plurality of reproduction signal evaluation values corresponding to the plurality of preliminary drive conditions. The extraction unit 95 is capable of: judging whether an obtained reproduction signal evaluation value is a reproduction signal evaluation value obtained in a first cycle; and storing a reproduction signal evaluation value or the like in a storage unit 98.

Particularly, the magnetic recording/reproducing apparatus of this embodiment operates as follows. Assuming that first preliminary recording (preliminary recording conducted in a first cycle) is excluded from consideration, every time the preliminary recording unit 93 conducts preliminary recording of information onto the recording area, the judgment unit 94 judges which one of a reproduction signal evaluation value corresponding to preliminary recording currently conducted and the reference value is superior to the other. Then, every time the judgment unit 94 produces a judgment result indicating that a reproduction signal evaluation value is in agreement with or superior to the reference value, the extraction unit 95 judges which one of reproduction signal evaluation values is superior to the other between (i) a reproduction signal evaluation value currently obtained and (ii) a previous reproduction signal evaluation value having a immediately preceding judgment result by the judgment unit 94 indicating that the reproduction signal evaluation value is in agreement with or superior to the reference value ("the previous reproduction signal evaluation value"). Here, the extraction unit 95 controls the preliminary recording unit 93 so that heating power provided to the preliminary recording area is gradually increased with the number of times preliminary recording is conducted when preliminary recording of information onto the preliminary recording area is conducted by the preliminary recording unit 93 multiple times. When it is judged that the currently obtained reproduction signal evaluation value is inferior to the previous reproduction signal evaluation value as a result of judgment about superiority between the two reproduction signal evaluation values, the extraction unit 95 extracts a preliminary drive condition corresponding to the previous reproduction signal evaluation value from a plurality of preliminary drive conditions corresponding to preliminary recording conducted multiple times.

The following describes the operation process of the magnetic recording/reproducing apparatus of this embodiment, with reference to FIG. 13. First, in step S21, while a magnetic recording medium 82 is rotated and a recording head 23 is above the preliminary recording area, the preliminary recording unit 93 which has received an instruction from the extraction unit 95 applies current to a metal wire 23a of the recording head 23, and conducts a laser light application step, in which drive current in accordance with a preliminary drive condition is supplied to a semiconductor laser element 25 thereby causing the semiconductor laser element 25 to emit laser light 26. The step S21 is conducted in the same way as in the step S1 of the first embodiment.

Next, in step S22, based on an instruction from a controller 92, a reproducing head 22 is positioned. That is, in the step S22, current applied to the metal wire 23a of the recording head 23 and the drive current for the semiconductor laser element 25 are turned off, and the reproducing head 22 is positioned at a location within the preliminary recording area, at which information has been preliminarily recorded in the step S21. The step S22 is conducted in the same way as in the step S2 of the first embodiment.

Then, in step S23, in response to an instruction from the extraction unit 95, a judgment unit 94 obtains a reproduction signal evaluation value and stores the value. The step S23 is conducted in the same way as in the step S3 of the first embodiment.

After that, in step S24, the extraction unit 95 judges whether the step S23 of obtaining a reproduction signal evaluation value is conducted in a first cycle. When the step S23 of obtaining a reproduction signal evaluation value is conducted in the first cycle (S24: YES), the extraction unit 95 stores a preliminary drive condition corresponding to the reproduction signal evaluation value of the first cycle in the storage unit 98, in step S27. When the step S23 is not conducted in the first cycle (S24: NO), the process proceeds to step S25.

In the step S25, in response to an instruction from the extraction unit 95, the judgment unit 94 judges whether the reproduction signal evaluation value obtained in the step S23 is equal to or greater than a reference value. When it is judged that the reproduction signal evaluation value is not equal to or not greater than the reference value in the judgment step (S25: NO), the process proceeds to step S28.

When it is judged that the reproduction signal evaluation value is equal to or greater than the reference value (S25: YES), the extraction unit 95 judges, in step S26, whether the reproduction signal evaluation value currently obtained in the step S23 is superior to a reproduction signal evaluation value obtained in step S23 of the last loop, i.e., loop just before the present loop ("the previous reproduction signal evaluation value"). When the reproduction signal evaluation value currently obtained is not superior to the previous reproduction signal evaluation value (S26: NO), the process ends. When the reproduction signal evaluation value currently obtained is superior to the previous reproduction signal evaluation value (S26: YES), in step S27, the extraction unit 95 stores, in the storage unit 98, a preliminary drive condition corresponding to the superior reproduction signal evaluation value, which is currently obtained in the step S23.

In step S28, a preliminary recording terminating unit 97 judges whether a value of the drive current of the semiconductor laser element 25 used in the step S21 exceeds a maximum drive current value, which is predefined to prevent overheating of the magnetic recording medium 82.

When, in the step S28, it is judged that the drive current of the semiconductor laser element 25 used in the step S21 exceeds the maximum drive current value (S28: YES), the preliminary recording terminating unit 97 controls the extraction unit 95 so that no more preliminary recording is conducted by the preliminary recording unit 93 and the process ends. When it is judged that the drive current of the semiconductor laser element 25 used in the step S21 does not exceed the maximum drive current value (S28: NO), the process proceeds to step S29.

In the step S29, the preliminary recording unit 93 receives an instruction to increment, by a predetermined value, the value of the drive current of the semiconductor laser element 25 next time preliminary recording is conducted. In step S30, the recording head 23 is moved by the control block 87 to a location different from the last location at which near-field light is applied, and then the process returns to the step S21. These steps are repeatedly conducted until the process ends.

The above description of "to increment, by a predetermined value, the value of the drive current of the semiconductor laser element 25" specifically means that the value of the drive current is incremented so that the amount of light emitted from the semiconductor laser element 25 is increased by 0.1 mW or 0.5 mW. Such a change in the amount of emitted light results in an increase in heating power.

According to the magnetic recording/reproducing apparatus 200 having the above-described structure, even if environmental temperature is changed, e.g., seasonally, it is possible to quickly obtain a preferable drive condition of the semiconductor laser element 25, under which the temperature of the magnetic recording medium 82 is adjusted to an intended temperature (e.g., a temperature falling within a range suitable for conducting recording onto the magnetic recording medium 82). As a result, it is possible to provide the magnetic recording/reproducing apparatus 200 capable of easily conducting heat-assisted magnetic recording without substantially affected by environmental temperature. In addition, it is possible to surely prevent overheating of the magnetic recording medium 82, when information is recorded.

In addition, every time preliminary recording is conducted, it is judged which one of a reproduction signal evaluation value and a reference value is superior to the other; and every time a judgment result is obtained which indicates that a reproduction signal evaluation value currently obtained is in agreement with or superior to the reference value, it is judged which one of the reproduction signal evaluation values is superior to the other between (i) the reproduction signal evaluation value currently obtained and (ii) a previous reproduction signal evaluation value having a immediately preceding judgment result indicating that the reproduction signal evaluation value is in agreement with or superior to the reference value. Accordingly, it is possible to efficiently extract a drive condition corresponding to the best reproduction signal evaluation value, from a plurality of reproduction signal evaluation values corresponding to a plurality of drive conditions.

In the case where Bit Error Rate is employed as a reproduction signal evaluation value and the amount of data included in the signal recorded in the step S21 is small, there is a possibility that minimum Bit Error Rate corresponds to a plurality of drive conditions. In that case, a reproduction signal evaluation value currently obtained is in agreement with the previous reproduction signal evaluation value in the step S26. Therefore, one modification may be configured so that the process proceeds to the step S27 when a reproduction signal evaluation value currently obtained is in agreement with the previous reproduction signal evaluation value, in the step S26.

Further, in the case where there are a plurality of drive conditions each corresponding to a same reproduction signal evaluation value and that reproduction signal evaluation value is the best value, there may be employed, among these drive conditions, a drive condition intermediate between a drive condition corresponding to the smallest heating power and a drive condition corresponding to the largest heating power.

Further, it is possible to decrease the possibility of overheating of the magnetic recording medium 82, by modifying the flow of operation process in FIG. 13 so that no more preliminary recording is conducted after the quality of reproduction signal evaluation value is changed from higher quality to lower quality. Therefore, in the case where a servo signal is recorded onto the magnetic recording medium 82 in advance, it is possible to prevent this servo signal to be erased.

The magnetic recording/reproducing apparatus 200 of this embodiment can be modified in a same way as the first to third modifications of the first embodiment.

In the flow chart shown in FIG. 13, the steps S24 and S25 may be interchanged with each other. In that case, when a judgment result is YES in a step which is conducted subsequently to the step S23 and equivalent to the step S25, the process proceeds to a step equivalent to the step S24. When the judgment result is NO, the process proceeds to the step S28. When a judgment result is YES in a step equivalent to the step S24, the process proceeds to the step S27. Meanwhile when a judgment result is NO, the process proceeds to the step S26.

Note that various changes and variations can be made in the above-described embodiments and modifications without departing from the scope of the claims, and the present invention is not limited to the above-described embodiments and modifications. For example, explanation will be given about a case where the step S2 (step of positioning the magnetic head) of the first embodiment can be omitted in each of the above-described embodiments and modifications. In the step S2, the magnetic head 1, which has recorded a signal in the step S1 and then moved after the recording of information, is returned again to the location at which the signal is recorded. However, it is possible to conduct recording and reproducing successively in an apparatus which includes a magnetic head 1 having a recording head 23 and a reproducing head 22 which are aligned in a rotation direction of a magnetic recording medium 2. In this structure, the step S2 can be omitted.

Figure 14A:
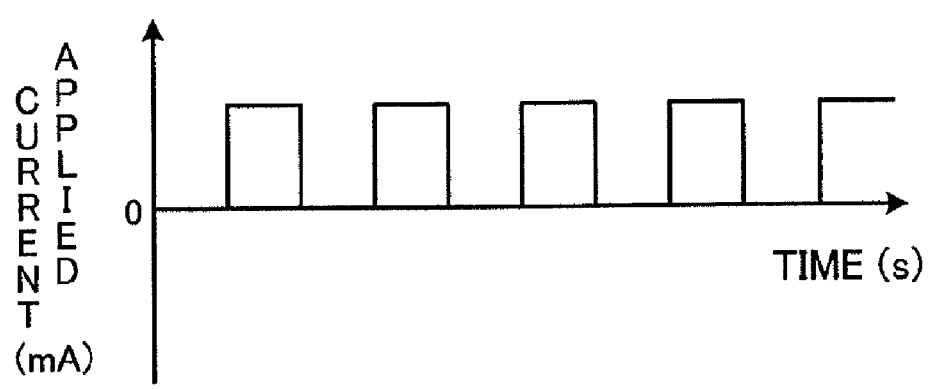
FIG. 14(a) A graph showing one modification of the current signal applied to the metal wire of the recording head.

Furthermore, in each of the above-described embodiments and modifications, recording current applied to the metal wire 23a of the recording head is not limited to the current as illustrated in FIG. 5(a) or 5(b). For example, current as illustrated in FIG. 14(a) may be applied, that is a rectangular-wave signal constant in amplitude and frequency, whose current value is always positive (or negative) may be applied. In that case, the polarity of the current is not limited, as long as recording is conducted so that the direction of recording magnetization is opposite to a direction of magnetization of a medium onto which recording has not been conducted.

Figure 14B:
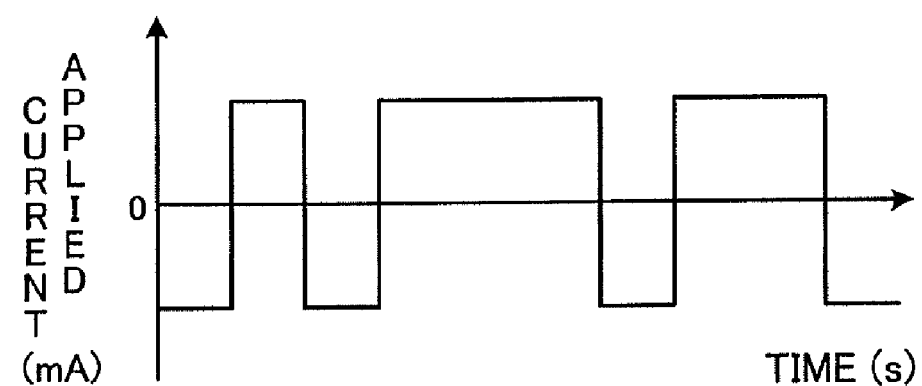
FIG. 14(b) A graph showing another modification of the current signal applied to the metal wire of the recording head.

Alternatively, applied current may be a signal as illustrated in FIG. 14(b), whose waveform has a constant amplitude and varying recording frequency. It is necessary to record a signal with varying recording frequency (random signal) in the case where Bit Error Rate or a value obtained through SAM is used as a reproduction signal evaluation value. Therefore, in that case, current as illustrated in FIG. 14(b) is applied to the recording head.

Figure 15:
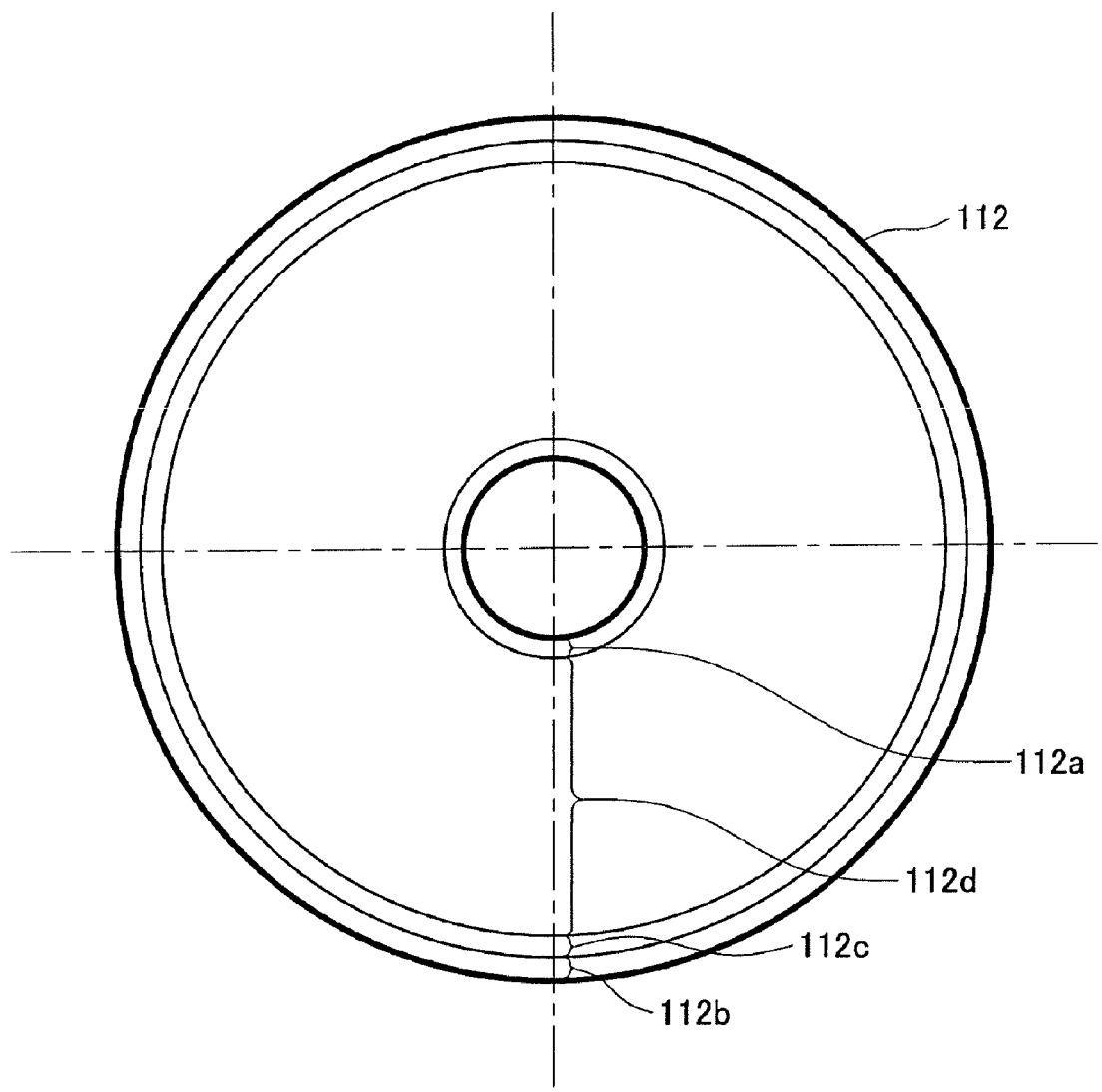
FIG. 15 A plan view of a magnetic recording medium, for explaining an area onto which information of drive condition is recorded.
Figure 16:
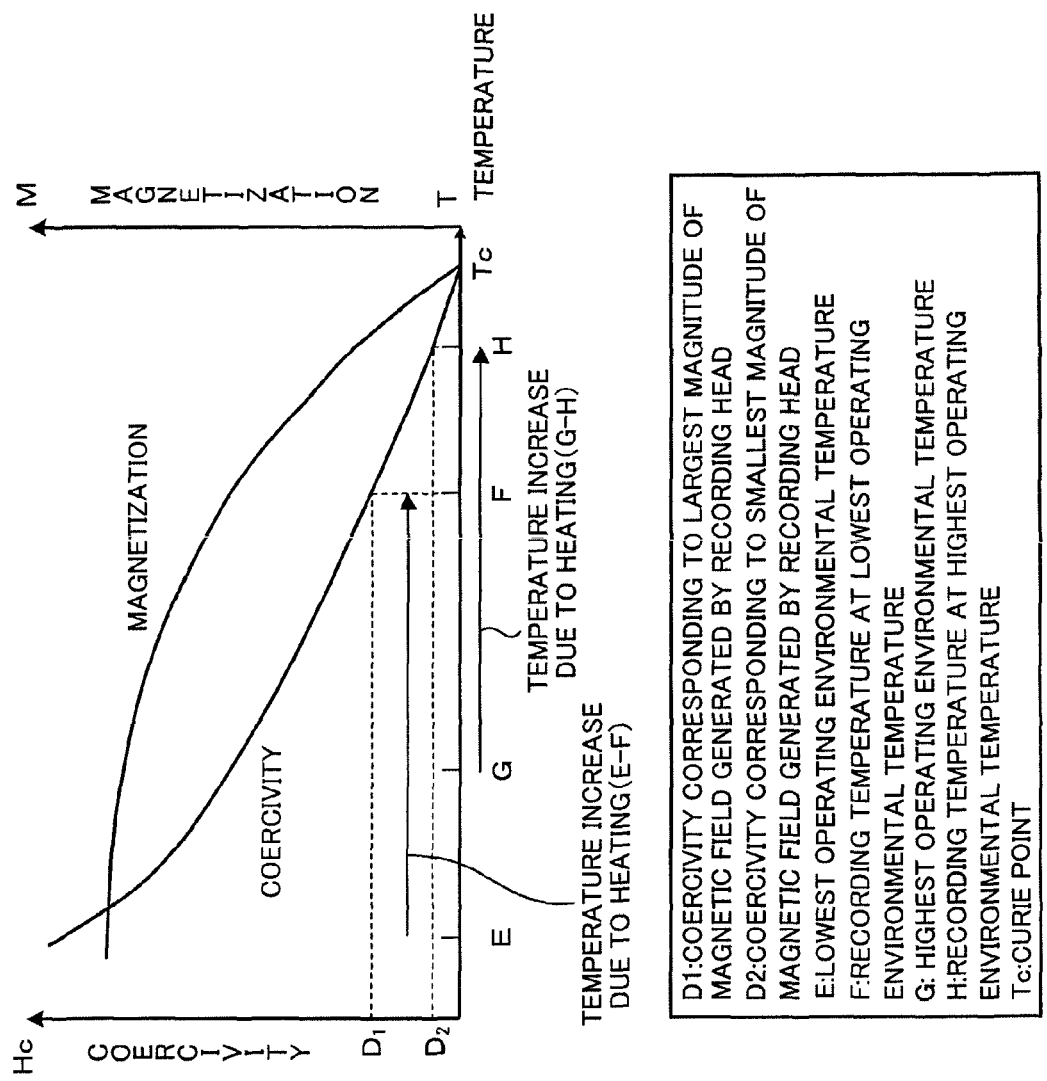
FIG. 16 A graph showing one example of a relation among coercivity Hc, magnetization M, and temperature T, of a recording layer of a magnetic recording medium used in a known heat-assisted magnetic recording/reproducing apparatus.

In the above-described embodiments and modifications, in order to conduct preliminary recording with the semiconductor laser 25, needed are, not only its drive current, but at least information on a radial location at which laser light is applied. Such information is magnetically recorded in a recording area 112c. The recording area 112c is situated, in a magnetic recording medium 112 shown in FIG. 15, inside a preliminary recording area 112b provided near the outermost circumference but outside a user recording area 112d. Thus, in a magnetic recording/reproducing apparatus having the magnetic recording medium 112 controlled so as to rotate at a constant angular velocity, information on a radial location at which laser light is applied is recorded in an area outside the user recording area 112d. This decreases a period of time needed to read the information. In the magnetic recording medium 112, the preliminary recording area 112a provided near the innermost circumference corresponds to the preliminary recording area 32a in the first modification of the first embodiment.

In the case where the magnetic recording/reproducing apparatus of each of the above-described embodiments and modifications has a temperature sensor mounted thereon, it is possible to record a drive condition and associated temperature information onto the recording area 112c when the drive condition is determined. At a next time, if present temperature is equal to the temperature information recorded onto the recording area 112c as a result of comparison, a process of determining a drive condition does not have to be conducted, and the drive condition recorded in association with the temperature information may be used. As another modification, when a drive condition is determined, an initial value of drive current of the semiconductor laser may be set to a value corresponding to the temperature first recorded onto the recording area 112c. This decreases the number of repetitions of the step S7 of the first embodiment, thereby reducing a period of time required for determining the drive current.

In each of the above-described embodiments and modifications, the magnetic recording medium is heated using near-field light. However, the magnetic recording medium may be heated by laser light, directly.

In each of the above-described embodiments and modifications, description has been made on a recording head formed integrally with a light source; however, this is not limitative. Another structure is possible, in which, for example, the light source is separately provided from the magnetic head and light emitted from the light source is applied to the recording head through an optical element such as an optical fiber, an optical waveguide, or a lens. In another modification, light emitted from the light source may be directly applied to a magnetic recording medium to heat the magnetic recording medium. Alternatively, a lens such as a gradient index lens or a diffractive lens may be disposed between the light source and the magnetic recording medium, to focus the light toward the magnetic recording medium.

As for the magnetic recording/reproducing apparatus described in each of the above embodiments and modifications, there may be a circumstance where image data is continuously recorded onto the recording medium for a long period of time. Under such a circumstance, environmental temperature may vary during recording. This can be dealt with by simply determining a drive condition anew, at regular intervals during recording of data (e.g., intervals with regard to period of time, or recording distance in a track), or every time the temperature varies by predetermined degrees if the magnetic recording/reproducing apparatus has a temperature sensor. In that case, a new drive condition may be determined in the way described above, i.e., by moving the magnetic head to the preliminary recording area provided on the magnetic recording medium. However, during the movement, it is required to store data to be recorded in a buffer memory, which needs a large buffer memory. To deal with this, a preliminary recording area may be provided within or near the user recording area. To a preliminary recording area, a specific sector may be allocated. Reserving such a specific sector for preliminary recording makes it easier to manage addresses, which are used for erasing data recorded during preliminary recording after a drive condition is determined. In addition, in the above-mentioned case, since a drive condition has to be determined within a short period of time, it is preferable to use the amplitude of a reproduction signal as a reproduction signal evaluation value, instead of Bit Error Rate which needs a large amount of recorded data.

Another modification of the above-described embodiments and modifications may be configured as follows: in the case where a plurality of magnetic heads are included (e.g., for double-sided magnetic recording to one magnetic recording medium, or for a plurality of magnetic recording media), a magnetic head used for the process flow of determining a drive condition may be changed in rotation among the magnetic heads, to prevent overheating of the heat means. This will be specifically described, using the first embodiment as an example. In the process flow of FIG. 4, a first cycle of the process of determining a drive condition is conducted using a first magnetic head, and a second cycle of the process of determining a drive condition is conducted using another magnetic recording medium and magnetic head, which are different from those in the first cycle. Such a modification reduces a period of time needed to determine a drive condition for each magnetic head. Accordingly, it is possible to prevent overheating of the heat means.

Still another modification of the above-described embodiments and modifications may be configured as follows: in the case where a plurality of magnetic heads are included (e.g., for double-sided magnetic recording to one magnetic recording medium, or for a plurality of magnetic recording media), one of the magnetic heads is used for determining a drive condition while another magnetic head conducts recording of user data. In this configuration, it is possible to determine a drive condition in parallel with recording of user data. This allows the capacity of buffer memory to be small. Note that, generally the plurality of magnetic heads are driven by one voice coil motor, and therefore the magnetic heads are positioned at approximately same radial locations, respectively. Therefore, in this configuration, a desirable arrangement is that a user recording area of one magnetic recording medium and a preliminary recording area of another magnetic recording medium are provided so that these areas overlap each other with regard to a radial location.

The invention claimed is:

1. A magnetic recording/reproducing apparatus, including:
a recording head;
a magnetoresistive reproducing head;
a magnetic recording medium onto which information is recordable; and
heat means for heating a recording area of the magnetic recording medium, the apparatus having a configuration such that:
information is recorded onto the magnetic recording medium by applying current to the recording head to generate a magnetic field while heating the recording area of the magnetic recording medium with the heat means thereby to reduce coercivity of the magnetic recording medium; and information recorded onto the recording area of the magnetic recording medium is reproduced with the reproducing head, the magnetic recording/reproducing apparatus further comprising:
preliminary recording means for preliminarily recording information onto the recording area of the magnetic recording medium, by exerting control so that constant current or current with a constant amplitude waveform is applied to the recording head, while driving the heat means in accordance with a preliminary drive condition so that heating power is provided by the heat means to the recording area of the magnetic recording medium;
judgment means for judging which one of a reproduction signal evaluation value and a predetermined reference value is superior to the other, the reproduction signal evaluation value resulting from a reproduction signal obtained through reproduction, by the reproducing head, of information which has been preliminarily recorded by the preliminary recording means onto the recording area;
extraction means for controlling the preliminary recording means and the judgment means so that preliminary recording of information onto the recording area is conducted by the preliminary recording means once or multiple times using a different preliminary drive condition each time, until the judgment means produces a judgment result indicating that the reproduction signal evaluation value is in agreement with or superior to the predetermined reference value, and for extracting a preliminary drive condition of the heat means corresponding to the judgment result by the judgment means indicating that the reproduction signal evaluation value is in agreement with or superior to the predetermined reference value; and
drive condition determining means for determining that the preliminary drive condition extracted by the extraction means is a drive condition of the heat means, which is used when information is recorded onto the magnetic recording medium, wherein
the extraction means controls the preliminary recording means so that heating power provided to the recording area is gradually increased with the number of times preliminary recording is conducted when preliminary recording of information onto the recording area is conducted by the preliminary recording means multiple times.

2. The magnetic recording/reproducing apparatus according to claim 1, further comprising preliminary recording terminating means for controlling the extraction means so that the preliminary recording means conducts no more preliminary recording after heating power provided to the recording area reaches a predetermined upper limit.

3. The magnetic recording/reproducing apparatus according to claim 1, wherein
the heat means includes a light-emitting element; and
the magnetic recording medium is heated using light emitted from the light-emitting element.

4. The magnetic recording/reproducing apparatus according to claim 3, wherein:
the recording head has a metal wire which generates a recording magnetic field as a result of applying the constant current or the current with a constant amplitude waveform to the metal wire; and the magnetic recording medium is heated by near-field light which is generated as a result of applying light emitted from the light-emitting element to the metal wire.

5. A magnetic recording/reproducing apparatus, including:
a recording head;
a magnetoresistive reproducing head;
a magnetic recording medium onto which information is recordable; and
heat means for heating a recording area of the magnetic recording medium, the apparatus having a configuration such that:
information is recorded onto the magnetic recording medium by applying current to the recording head to generate a magnetic field while heating the recording area of the magnetic recording medium with the heat means thereby to reduce coercivity of the magnetic recording medium; and information recorded onto the recording area of the magnetic recording medium is reproduced with the reproducing head, the magnetic recording/reproducing apparatus further comprising:
preliminary recording means for preliminarily recording information onto the recording area of the magnetic recording medium, by exerting control so that constant current or current with a constant amplitude waveform is applied to the recording head, while driving the heat means in accordance with a preliminary drive condition so that heating power is provided by the heat means to the recording area of the magnetic recording medium;
judgment means for judging which one of a reproduction signal evaluation value and a predetermined reference value is superior to the other, the reproduction signal evaluation value resulting from a reproduction signal obtained through reproduction, by the reproducing head, of information which has been preliminarily recorded by the preliminary recording means onto the recording area;
extraction means for controlling the preliminary recording means and the judgment means so that preliminary recording of information onto the recording area is conducted by the preliminary recording means once or multiple times using a different preliminary drive condition each time, until the judgment means produces a judgment result indicating that the reproduction signal evaluation value is in agreement with or superior to the predetermined reference value, and for extracting a preliminary drive condition of the heat means corresponding to the judgment result by the judgment means indicating that the reproduction signal evaluation value is in agreement with or superior to the predetermined reference value; and
drive condition determining means for determining that the preliminary drive condition extracted by the extraction means is a drive condition of the heat means, which is used when information is recorded onto the magnetic recording medium, wherein
the extraction means controls the preliminary recording means so that heating power provided to the recording area is gradually increased with the number of times preliminary recording is conducted when preliminary recording of information onto the recording area is conducted by the preliminary recording means multiple times;
the magnetic recording medium is disk-shaped;
the preliminary recording means preliminarily records, while rotating the magnetic recording medium at a predetermined angular velocity, information onto (i) a first preliminary recording area which covers a location at a distance ri from a center of the magnetic recording medium and is provided in the recording area of the magnetic recording medium, and (ii) a second preliminary recording area which covers a location at a distance ro (ro>ri) from the center of the magnetic recording medium and is provided in the recording area of the magnetic recording medium so as to be closer to the outer circumference of the magnetic recording medium than the first preliminary recording area is;
the drive condition determining means determines drive conditions of the heat means respectively used at: a location within the first preliminary recording area, which location is at the distance ri from the center of the magnetic recording medium, and a location within the second preliminary recording area, which location is at the distance ro from the center of the magnetic recording medium; and
the magnetic recording/reproducing apparatus further comprises drive condition deriving means for deriving a drive condition of the heat means, which is used when information is recorded at a location being at an arbitrary distance r from the center of the magnetic recording medium rotated at the predetermined angular velocity, based on heating power Pr obtained using the following equation (A):

$$Pr=Pi+(r-ri)\times(Po-Pi)/(ro-ri) \qquad (A)$$

where: Pi is heating power provided to the first preliminary recording area of the magnetic recording medium by the heat means driven under the drive condition which is determined by the drive condition determining means for the location at the distance ri;
Po is heating power provided to the second preliminary recording area of the magnetic recording medium by the heat means driven under the drive condition which is determined by the drive condition determining means for the location at the distance ro; and
Pr is heating power used for recording information at a location which is at an arbitrary distance r from the center of the magnetic recording medium.

6. A magnetic recording/reproducing apparatus, including:
a recording head;
a magnetoresistive reproducing head;
a magnetic recording medium onto which information is recordable; and
heat means for heating a recording area of the magnetic recording medium, the apparatus having a configuration such that:
information is recorded onto the magnetic recording medium by applying current to the recording head to generate a magnetic field while heating the recording area of the magnetic recording medium with the heat means thereby to reduce coercivity of the magnetic recording medium; and information recorded onto the recording area of the magnetic recording medium is reproduced with the reproducing head, the magnetic recording/reproducing apparatus further comprising:
preliminary recording means for preliminarily recording information onto the recording area of the magnetic recording medium, by exerting control so that constant current or current with a constant amplitude waveform is applied to the recording head, while driving the heat means in accordance with a preliminary drive condition so that heating power is provided by the heat means to the recording area of the magnetic recording medium;

judgment means for judging which one of a reproduction signal evaluation value and a predetermined reference value is superior to the other, the reproduction signal evaluation value resulting from a reproduction signal obtained through reproduction, by the reproducing head, of information which has been preliminarily recorded by the preliminary recording means onto the recording area;

extraction means for controlling the preliminary recording means and the judgment means so that preliminary recording of information onto the recording area is conducted by the preliminary recording means once or multiple times using a different preliminary drive condition each time, until the judgment means produces a judgment result indicating that the reproduction signal evaluation value is in agreement with or superior to the predetermined reference value, and for extracting a preliminary drive condition of the heat means corresponding to the judgment result by the judgment means indicating that the reproduction signal evaluation value is in agreement with or superior to the predetermined reference value; and drive condition determining means for determining that the preliminary drive condition extracted by the extraction means is a drive condition of the heat means, which is used when information is recorded onto the magnetic recording medium, wherein the extraction means controls the preliminary recording means so that heating power provided to the recording area is gradually increased with the number of times preliminary recording is conducted when preliminary recording of information onto the recording area is conducted by the preliminary recording means multiple times;

the magnetic recording medium is disk-shaped;

the preliminary recording means preliminarily records, while rotating the magnetic recording medium at a predetermined angular velocity, information onto (i) a first preliminary recording area which covers a location at a distance ri from a center of the magnetic recording medium and is provided in the recording area of the magnetic recording medium, and (ii) a second preliminary recording area which covers a location at a distance ro (ro>ri) from the center of the magnetic recording medium and is provided in the recording area of the magnetic recording medium so as to be closer to the outer circumference of the magnetic recording medium than the first preliminary recording area is;

the drive condition determining means determines drive conditions of the heat means respectively used at: a location within the first preliminary recording area, which location is at the distance ri from the center of the magnetic recording medium, and a location within the second preliminary recording area, which location is at the distance ro from the center of the magnetic recording medium; and the magnetic recording/reproducing apparatus further comprises drive condition deriving means for determining that a drive condition of the heat means used at a location being at a distance rc from the center of the magnetic recording medium rotated at the predetermined angular velocity is a drive condition of the heat means to be used when information is recorded onto a recording area interposed between the first preliminary recording area and the second preliminary recording area, the distance rc being an average distance of the distance ro and the distance ri, the drive condition of the heat means used at the location at the distance rc being derived based on heating power Prc obtained using the following equation (B):

$$Prc = Pi + (rc-ri) \times (Po-Pi)/(ro-ri) \qquad (B)$$

where: Pi is heating power provided to the first preliminary recording area of the magnetic recording medium by the heat means driven under the drive condition which is determined by the drive condition determining means for the location at the distance ri;

Po is heating power provided to the second preliminary recording area of the magnetic recording medium by the heat means driven under the drive condition which is determined by the drive condition determining means for the location at the distance ro; and Prc is heating power used for recording information at a location which is at the distance rc from the center of the magnetic recording medium.

7. A magnetic recording/reproducing apparatus, including:
a recording head;
a magnetoresistive reproducing head;
a magnetic recording medium onto which information is recordable; and
heat means for heating a recording area of the magnetic recording medium, the apparatus having a configuration such that:

information is recorded onto the magnetic recording medium by applying current to the recording head to generate a magnetic field while heating the recording area of the magnetic recording medium with the heat means thereby to reduce coercivity of the magnetic recording medium; and information recorded onto the recording area of the magnetic recording medium is reproduced with the reproducing head, the magnetic recording/reproducing apparatus further comprising:

preliminary recording means for preliminarily recording information onto the recording area of the magnetic recording medium, by exerting control so that constant current or current with a constant amplitude waveform is applied to the recording head, while driving the heat means in accordance with a preliminary drive condition so that heating power is provided by the heat means to the recording area of the magnetic recording medium;

judgment means for judging which one of a reproduction signal evaluation value and a predetermined reference value is superior to the other, the reproduction signal evaluation value resulting from a reproduction signal obtained through reproduction, by the reproducing head, of information which has been preliminarily recorded by the preliminary recording means onto the recording area;

extraction means for controlling the preliminary recording means and the judgment means so that preliminary recording of information onto the recording area is conducted by the preliminary recording means once or multiple times using a different preliminary drive condition each time, until the judgment means produces a judgment result indicating that the reproduction signal evaluation value is in agreement with or superior to the predetermined reference value, and for extracting a preliminary drive condition of the heat means corresponding to the judgment result by the judgment means indicating that the reproduction signal evaluation value is in agreement with or superior to the predetermined reference value; and drive condition determining means for determining that the preliminary drive condition extracted by the extraction means is a drive condition of the heat means, which is used when information is recorded onto the magnetic recording medium, wherein the extraction means controls the preliminary recording means so that heating power provided to the recording area is gradually increased with the number of times preliminary recording is conducted when preliminary recording of information onto the recording area is conducted by the preliminary recording means multiple times;

the magnetic recording medium is disk-shaped;

the recording area of the magnetic recording medium is provided with a plurality of zones which do not overlap one another with regard to each range of distance from a center of the magnetic recording medium, in each of which zones an internal transfer rate is constant;

the preliminary recording means preliminarily records, while rotating the magnetic recording medium at a predetermined angular velocity, information onto (i) a first preliminary recording area which covers a location at a distance ri from the center of the magnetic recording medium and is provided in the recording area of the magnetic recording medium, and (ii) a second preliminary recording area which covers a location at a distance ro (ro>ri) from the center of the magnetic recording medium and is provided in the recording area of the magnetic recording medium so as to be closer to the outer circumference of the magnetic recording medium than the first preliminary recording area is;

the drive condition determining means determines drive conditions of the heat means respectively used at: a location within the first preliminary recording area, which location is at the distance ri from the center of the magnetic recording medium, and a location within the second preliminary recording area, which location is at the distance ro from the center of the magnetic recording medium; and the magnetic recording/reproducing apparatus further comprises drive condition deriving means for determining that a drive condition of the heat means used when information is recorded at a location midway between a location farthest from the center and a location closest to the center in each of the zones of the magnetic recording medium rotated at the predetermined angular velocity is a drive condition of the heat means to be used when information is recorded onto the associated one of the zones, the drive condition of the heat means used at each midway location being derived based on heating power Pr obtained using the following equation (C):

$$Pr=Pi+(rz-ri)\times(Po-Pi)/(ro-ri) \qquad (C)$$

where: Pi is heating power provided to the first preliminary recording area of the magnetic recording medium by the heat means driven under the drive condition which is determined by the drive condition determining means for the location at the distance ri;

Po is heating power provided to the second preliminary recording area of the magnetic recording medium by the heat means driven under the drive condition which is determined by the drive condition determining means for the location at the distance ro; and Pr is heating power used for recording information at the midway location in each zone of the magnetic recording medium, location at a distance rz from the center of the magnetic recording medium.

8. The magnetic recording/reproducing apparatus according to claim 5, wherein information on the drive conditions determined by the drive condition determining means and the drive condition deriving means are recorded onto an area closer to the outer circumference than a user recording area in the magnetic recording medium is, onto which user recording area information a user desires to record is recorded.

9. The magnetic recording/reproducing apparatus according to claim 6, wherein information on the drive conditions determined by the drive condition determining means and the drive condition deriving means are recorded onto an area closer to the outer circumference than a user recording area in the magnetic recording medium is, onto which user recording area information a user desires to record is recorded.

10. The magnetic recording/reproducing apparatus according to claim 7, wherein information on the drive conditions determined by the drive condition determining means and the drive condition deriving means are recorded onto an area closer to the outer circumference than a user recording area in the magnetic recording medium is, onto which user recording area information a user desires to record is recorded.

* * * * *